(12) United States Patent
Gan et al.

(10) Patent No.: US 12,445,177 B2
(45) Date of Patent: Oct. 14, 2025

(54) FULL-DUPLEX COMMUNICATION METHOD AND APPARATUS

(71) Applicant: HUAWEI TECHNOLOGIES CO., LTD., Guangdong (CN)

(72) Inventors: Ming Gan, Shenzhen (CN); Jingjing Huang, Shenzhen (CN); Dandan Liang, Shenzhen (CN); Tao Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 404 days.

(21) Appl. No.: 17/959,028

(22) Filed: Oct. 3, 2022

(65) Prior Publication Data

US 2023/0026859 A1 Jan. 26, 2023

Related U.S. Application Data

(63) Continuation of application No. 17/012,263, filed on Sep. 4, 2020, now Pat. No. 11,496,190, which is a
(Continued)

(30) Foreign Application Priority Data

Mar. 8, 2018 (CN) .......................... 201810191691.6

(51) Int. Cl.
*H04B 7/0491* (2017.01)
*H04B 7/06* (2006.01)
(Continued)

(52) U.S. Cl.
CPC ......... *H04B 7/0491* (2013.01); *H04B 7/0617* (2013.01); *H04B 7/0619* (2013.01); *H04B 7/086* (2013.01); *H04L 5/14* (2013.01)

(58) Field of Classification Search
CPC .. H04B 7/0491; H04B 7/0617; H04B 7/0619; H04B 7/086; H04B 7/0452; H04B 1/50;
(Continued)

(56) References Cited

U.S. PATENT DOCUMENTS

2011/0243040 A1 10/2011 Khan et al.
2013/0258885 A1* 10/2013 Yu ...................... H04B 7/0632
370/252
(Continued)

FOREIGN PATENT DOCUMENTS

| CN | 102884731 A | 1/2013 |
| CN | 103209415 A | 7/2013 |

(Continued)

OTHER PUBLICATIONS

EPO Communication pursuant to Rule 164(1) EPC issued in European Application No. 19763276.3 on Mar. 18, 2021, 10 pages.
(Continued)

*Primary Examiner* — Shawn D Miller
(74) *Attorney, Agent, or Firm* — Fish & Richardson P.C.

(57) ABSTRACT

This application provides a communication method and an apparatus. One example method includes receiving, by a first device in a first device set, a measurement signal sent by a second device; and sending, by the first device, a feedback signal based on the measurement signal, wherein the feedback signal carries information that indicates, to a third device, a device that is in the first device set and that is paired with the second device, and the feedback signal carries a device identifier of the second device.

20 Claims, 7 Drawing Sheets

Related U.S. Application Data continuation of application No. PCT/CN2019/077393, filed on Mar. 8, 2019.

(51) Int. Cl.
*H04B 7/08* (2006.01)
*H04L 5/14* (2006.01)

(58) Field of Classification Search
CPC .... H04B 7/0695; H04B 7/0697; H04B 7/088; H04B 17/309; H04L 5/14
See application file for complete search history.

(56) References Cited

U.S. PATENT DOCUMENTS

| | | |
|---|---|---|
| 2015/0163843 A1 | 6/2015 | Zhu et al. |
| 2015/0245377 A1 | 8/2015 | Lee |
| 2016/0119043 A1 | 4/2016 | Rajagopal et al. |
| 2016/0249245 A1 | 8/2016 | Kim et al. |
| 2016/0277902 A1* | 9/2016 | Wu ................ H04W 4/029 |
| 2017/0238294 A1 | 8/2017 | Lim et al. |
| 2017/0352954 A1 | 12/2017 | Abdallah et al. |
| 2018/0192431 A1* | 7/2018 | Wang ............... H04W 72/52 |
| 2019/0081674 A1 | 3/2019 | Oteri |

FOREIGN PATENT DOCUMENTS

| | | |
|---|---|---|
| CN | 104052529 A | 9/2014 |
| CN | 105897319 A | 8/2016 |
| CN | 106465409 A | 2/2017 |
| CN | 106877993 A | 6/2017 |
| CN | 107682065 A | 2/2018 |
| JP | 2002246984 A | 8/2002 |
| WO | 2016153204 A1 | 9/2016 |
| WO | 2017164900 A1 | 9/2017 |

OTHER PUBLICATIONS

Extended European Search Report issued in European Application No. 19763276.3 on May 14, 2021, 11 pages.
IEEE P802.11ay/D0.35, "Draft Standard for Information Technology—Telecommunications and Information Exchange Between Systems—Local and Metropolitan Area Networks—Specific Requirements—Part 11: Wireless LAN Medium Access Control (MAC) and Physical Layer(PHY) Specifications—Amendment 7: Enhanced throughput for operation in license-exempt bands above 45 GHz," May 2017, 256 pages.
IEEE Std 802.11ad-2012, "Part 11: Wireless LAN Medium Access Control (MAC) and Physical Layer (PHY) Specifications, Amendment 3: Enhancements for Very High Throughput in the 60 GHz Band," IEEE Computer Society, Oct. 19, 2012, 628 pages.
Office Action issued in Chinese Application No. 201810191691.6 on Jun. 16, 2021, 14 pages (with English translation).
Office Action issued in Chinese Application No. 201810191691.6 on Sep. 28, 2022, 4 pages.
PCT International Search Report and Written Opinion issued in International Application No. PCT/CN2019/077393 on May 29, 2019, 19 pages (with English translation).
U.S. Appl. No. 62/306,446, filed Mar. 10, 2016.
U.S. Appl. No. 62/416,883, filed Nov. 3, 2016.

* cited by examiner

FULL-DUPLEX COMMUNICATION METHOD AND APPARATUS

CROSS-REFERENCE TO RELATED APPLICATIONS

This application is a continuation of U.S. patent application Ser. No. 17/012,263, filed on Sep. 4, 2020, which is a continuation of International Application No. PCT/CN2019/077393, filed on Mar. 8, 2019, which claims priority to Chinese Patent Application No. 201810191691.6, filed on Mar. 8, 2018. All of the afore-mentioned patent applications are hereby incorporated by reference in their entireties.

TECHNICAL FIELD

This application relates to the communications field, and more specifically, to a full-duplex communication method and an apparatus.

BACKGROUND

With a full-duplex (FD) wireless communications technology, signals in uplink and downlink transmission directions can be simultaneously transmitted on a same radio channel, and spectrum utilization is theoretically doubled compared with that in half-duplex mode (for example, a frequency division duplex mode or a time division duplex mode).

In a conventional solution, while sending a first signal to a first station (STA), an access point (AP) can receive a second signal sent by a second station, to implement full-duplex wireless communication. However, how to configure a paired first station and second station to improve communication quality of a communications system is an issue to be urgently resolved.

SUMMARY

This application provides a full-duplex communication method, to help improve communication quality of a full-duplex wireless communications system.

According to a first aspect, a full-duplex communication method is provided. The method includes: when sending a first signal to a first device by using a first transmit sector in a transmit sector group, receiving, by a third device by using a first receive sector in a receive sector group, a second signal sent by a second device, where the first receive sector is different from the first transmit sector.

While sending the first signal to the first device by using the first transmit sector, the third device receives, by using the first receive sector, the second signal sent by the second device. A coverage area of the third device in a receiving direction may be divided into at least one receive sector, the at least one receive sector forms one receive sector group, and the third device may receive the second signal by using the first receive sector that is in the receive sector group and that is different from the first transmit sector. In this way, the third device can simultaneously receive a signal and send a signal by using different sectors, to implement full-duplex transmission, and reduce mutual interference between signal sending and signal receiving, thereby improving communication quality of the full-duplex transmission.

In some possible implementations, the first device belongs to a first device set corresponding to the first transmit sector, the first transmit sector is an optimal transmit sector used when the third device sends a signal to a device in the first device set, the second device belongs to a second device set corresponding to the first receive sector, the first receive sector is an optimal receive sector used when the third device receives a signal sent by a device in the second device set, and isolation between the first transmit sector and the first receive sector is greater than or equal to a first preset value.

The isolation may be a degree of signal attenuation of a signal sent by the third device by using a transmit sector relative to the signal received by the third device by using a receive sector. The third device can reduce self-interference by using the isolation, to improve communication quality of uplink and downlink transmission simultaneously performed by the third device.

In some possible implementations, before the receiving, by a third device by using a first receive sector in a receive sector group, a second signal sent by a second device, the method further includes: performing, by the third device, beam training for each transmit sector in the transmit sector group to obtain a device set corresponding to the transmit sector.

In this way, any device in the device set corresponding to the first transmit sector can be paired with any device in the device set corresponding to the first receive sector to perform full-duplex transmission with the third device, thereby improving signal transmission efficiency.

In some possible implementations, before the receiving, by a third device by using a first receive sector in a receive sector group, a second signal sent by a second device, the method further includes: performing, by the third device, beam training for each receive sector in the receive sector group to obtain a device set corresponding to the receive sector.

In this way, any device in the device set corresponding to the first transmit sector can be paired with any device in the device set corresponding to the first receive sector to perform full-duplex transmission with the third device, thereby improving signal transmission efficiency.

In some possible implementations, the performing, by the third device, beam training for each transmit sector in the transmit sector group to obtain a device set corresponding to the transmit sector includes: sending, by the third device, a first measurement signal to each of a plurality of devices by using each transmit sector, where the first measurement signal carries an identifier of the transmit sector used for sending the first measurement signal; receiving, by the third device, a first feedback signal fed back by each of the plurality of devices, where the first feedback signal fed back by each of the plurality of devices carries an identifier of at least one optimal transmit sector used when the device that sends the first feedback signal communicates with the third device and an identifier of the device that sends the first feedback signal, and the at least one optimal transmit sector belongs to the transmit sector group; and determining, by the third device based on the first feedback signal, a device included in the device set corresponding to each transmit sector.

In this embodiment of this application, beam training is performed for the transmit sector group of the third device, and both the second device and the first device can perform omnidirectional transmission. Therefore, compared with beam training in a high-frequency Wi-Fi scenario, in this embodiment of this application, a beam training procedure is simplified, and signaling overheads are reduced.

In a possible implementation, the third device receives, by using each receive sector, at least one second measurement signal sent by each of a plurality of devices, where each of the at least one second measurement signal carries an identifier of the device that sends the second measurement signal; determining, by the third device based on the at least one second measurement signal, at least one optimal receive sector used when the third device communicates with each of the plurality of devices; and determining, by the third device based on the at least one optimal receive sector used when the third device communicates with each device and the identifier of the device that sends the second measurement signal, a device included in the device set corresponding to each receive sector.

In this embodiment of this application, beam training is performed for the receive sector group of the third device, and both the second device and the first device can perform omnidirectional transmission. Therefore, compared with beam training in a high-frequency Wi-Fi scenario, in this embodiment of this application, a beam training procedure is simplified, and signaling overheads are reduced.

In some possible implementations, before the receiving, by a third device by using a first receive sector, a second signal sent by a second device, the method further includes: receiving, by the third device, at least one third feedback signal, where the at least one third feedback signal is generated by a device that is in the first device set and that receives a third measurement signal, the third measurement signal is sent by the second device, and each of the at least one third feedback signal carries a device identifier of the second device; and determining, by the third device based on the at least one third feedback signal, that the first device in the first device set is a device paired with the second device.

The third measurement signal may carry the identifier of the second device, or there is a correspondence between the third measurement signal and the second device. After receiving the third measurement signal, the device in the first device set can determine the device that sends the third measurement signal. The device that is in the first device set and that receives the third measurement signal generates the third feedback signal based on the third measurement signal, and sends the third feedback signal to the third device. The third device selects, from the first device set based on the received third feedback signal, the first device as a required paired device. In addition, the third feedback signal carries the device identifier of the second device. In this way, the third device can determine, based on the device identifier, that the first device is a device paired with the second device corresponding to the device identifier; and the third device can select the appropriate paired first device for the second device based on the third measurement signal sent by the second device, thereby improving communication quality of the full-duplex transmission of the third device.

In some possible implementations, the method further includes, sending, by the third device, a trigger signal, where the trigger signal is used to trigger the second device to send the third measurement signal, and/or the trigger signal is used to trigger the device in the first device set to send a third feedback signal after the device receives the third measurement signal.

The third device may send the trigger signal depending on a requirement, thereby avoiding an unnecessary waste and reducing signaling overheads.

In some possible implementations, the method further includes: sending, by the third device, a pairing relationship, where the pairing relationship includes a pairing relationship between the first transmit sector and the first receive sector.

After receiving the pairing relationship, the second device in the second device set may send the third measurement signal only to the first device set corresponding to the first transmit sector, thereby reducing signaling overheads.

In some possible implementations, the third measurement signal further carries an identifier of the receive sector corresponding to the device set to which the second device belongs.

The third measurement signal sent by the second device may further carry the identifier of the receive sector, corresponding to the second device set, of the third device. In this way, a device that is in a communications system and that does not belong to the first device set corresponding to an identifier of the first transmit sector may not send a feedback signal to the third device, thereby further reducing signaling overheads.

In some possible implementations, each of the at least one third feedback signal further carries an identifier of a device that sends the third feedback signal; and correspondingly, the determining, by the third device based on the at least one third feedback signal, that the first device in the first device set is a device paired with the second device includes: determining, by the third device, a device in the first device set other than the device that sends the at least one third feedback signal, as the first device.

In this way, the third device selects, from the first device set based on the received third feedback signal, the device that sends no third feedback signal as a device paired with the second device. This reduces interference caused by a signal sent by the first device to the third device to a signal sent by the third device to the second device, thereby improving communication quality of downlink signal transmission of the third device.

In some possible implementations, each of the at least one third feedback signal carries signal quality of the third measurement signal received by a device that sends the third feedback signal and an identifier of the device that sends the third feedback signal; and correspondingly, the determining, by the third device based on the at least one third measurement signal, that the first device in the first device set is a device paired with the second device corresponding to the device identifier includes: determining, by the third device, a device that is in the first device set and that sends a third feedback signal with lowest signal quality, as the first device.

When each device in the first device set receives the third measurement signal, the device that receives the third measurement signal may add a detection result of the third measurement signal to a third feedback signal; and the third device determines a device corresponding to a signal with lowest signal quality in the detection result as a device paired with the second device.

According to a second aspect, a full-duplex communication method is provided. The method includes: receiving, by a first device in a first device set, a measurement signal sent by a second device; and sending, by the first device, a feedback signal based on the measurement signal, where the feedback signal is used by a third device to determine a device that is in the first device set and that is paired with the second device, and the feedback signal carries a device identifier of the second device.

The first device that is in the first device set and that receives the measurement signal generates the feedback signal based on the measurement signal, and sends the feedback signal to the third device; and the third device selects, from the first device set based on the received feedback signal, the first device as a required paired device. In addition, the feedback signal carries the device identifier of the second device. In this way, the third device can determine, based on the device identifier, that the first device is a device paired with the second device corresponding to the device identifier, thereby improving communication quality of full-duplex transmission of the third device.

In some possible implementations, the first device set is corresponding to a first transmit sector, the first transmit sector is an optimal transmit sector used when the third device sends a signal to a device in the first device set, the second device belongs to a second device set corresponding to a first receive sector, the first receive sector is an optimal receive sector used when the third device receives a signal sent by a device in the second device set, isolation between the first transmit sector and the first receive sector is greater than or equal to a first preset value, the first transmit sector is a transmit sector in a transmit sector group of the third device, and the first receive sector is a receive sector in a receive sector group of the third device.

The isolation may be a degree of signal attenuation of a signal sent by the third device by using a transmit sector relative to the signal received by the third device by using a receive sector. Self-interference can be reduced by using the isolation, to improve communication quality of uplink and downlink transmission simultaneously performed by the third device.

In some possible implementations, the method further includes: receiving, by the first device, a pairing relationship, where the pairing relationship includes a pairing relationship between the first transmit sector and the first receive sector.

In some possible implementations, the measurement signal further includes an identifier of the first receive sector corresponding to the second device set to which the second device belongs, and the sending, by the first device, a feedback signal based on the measurement signal includes: determining, by the first device based on the pairing relationship and the identifier of the first receive sector, a transmit sector corresponding to the receive sector indicated by the identifier of the first receive sector; and sending, by the first device, the feedback signal when the first device belongs to a device set corresponding to the transmit sector.

The measurement signal may further carry the identifier of the receive sector corresponding to the second device set to which the second device belongs. In this way, a device that is in a communications system and that does not belong to the first device set corresponding to an identifier of the first transmit sector may not send a feedback signal to the third device, thereby further reducing signaling overheads.

In some possible implementations, before the sending, by the first device, a feedback signal, the method further includes: receiving, by the first device, a trigger signal, where the trigger signal is used to trigger the first device to send the feedback signal after the first device receives the measurement signal.

The first device may send the feedback signal depending on a requirement of the third device, thereby avoiding an unnecessary waste and reducing signaling overheads.

In some possible implementations, the sending, by the first device, a feedback signal based on the measurement signal includes: sending, by the first device, the feedback signal when signal quality of the measurement signal is greater than or equal to a preset quality threshold.

In some possible implementations, the feedback signal further carries a signal quality detection result of the measurement signal received by the first device and an identifier of the first device.

The first device sends the feedback signal carrying the signal quality detection result. In this way, the third device determines a device corresponding to a signal with lowest signal quality in the detection result as a device paired with the second device.

In some possible implementations, the feedback signal further carries an identifier of the first device.

The first device sends the feedback signal carrying the identifier of the first device. In this way, the third device selects, from the first device set based on the received feedback signal, a device that sends no feedback signal as a device paired with the second device, thereby improving communication quality of downlink signal transmission of the third device.

In some possible implementations, when the first device is a device paired with the second device, the method further includes: sending, by the first device, a first signal to the third device.

According to a third aspect, a full-duplex communication method is provided. The method includes: generating, by a second device, a measurement signal, where the measurement signal is used by a device in a first device set to generate a feedback signal, the feedback signal is used by a third device to determine a first device that is in the first device set and that is paired with the second device, and the feedback signal carries a device identifier of the second device; and sending, by the second device, the measurement signal.

The second device in a second device set generates the measurement signal, and sends the measurement signal to the first device set; the device that is in the first device set and that receives the measurement signal generates the feedback signal based on the measurement signal, and sends the feedback signal to the third device; and the third device selects, from the first device set based on the received feedback signal, the first device as a required paired device. In addition, the feedback signal carries the device identifier of the second device. In this way, the third device can determine, based on the device identifier, that the first device is a device paired with the second device corresponding to the device identifier, thereby improving communication quality of full-duplex transmission of the third device.

In some possible implementations, the first device set is corresponding to a first transmit sector, the first transmit sector is an optimal transmit sector used when the third device sends a signal to a device in the first device set, the second device belongs to a second device set corresponding to a first receive sector, the first receive sector is an optimal receive sector used when the third device receives a signal sent by a device in the second device set, isolation between the first transmit sector and the first receive sector is greater than or equal to a first preset value, the first transmit sector is a transmit sector in a transmit sector group of the third device, and the first receive sector is a receive sector in a receive sector group of the third device.

The isolation may be a degree of signal attenuation of a signal sent by the third device by using a transmit sector relative to the signal received by the third device by using a receive sector. Self-interference can be reduced by using the isolation, to improve communication quality of uplink and downlink transmission simultaneously performed by the third device.

In some possible implementations, the method further includes: receiving, by the second device, a pairing relationship, where the pairing relationship includes a pairing relationship between the first transmit sector and the first receive sector.

After receiving the pairing relationship, the second device in the second device set may send the measurement signal only to the first device set corresponding to the first transmit sector, thereby reducing signaling overheads.

In some possible implementations, the measurement signal further includes an identifier of a receive sector corresponding to the second device set to which the second device belongs, and the identifier of the receive sector is used by a device that receives the measurement signal to send a feedback signal.

When the second device broadcasts the measurement signal, a device that receives the measurement signal may determine whether the device belongs to the first device set, and only a device in the first device set sends a feedback signal. This further reduces signaling overheads.

In some possible implementations, the method further includes: receiving, by the second device, a trigger signal, where the trigger signal is used to trigger the second device to send the measurement signal.

The second device may send the measurement signal depending on a requirement of the third device, thereby avoiding an unnecessary waste and reducing signaling overheads.

According to a fourth aspect, a full-duplex communications apparatus is provided. The apparatus may be a third device, or may be a chip in a third device. The apparatus has a function of implementing the implementations of the first aspect. The function may be implemented by hardware or may be implemented by hardware executing corresponding software. The hardware or software includes one or more units corresponding to the foregoing function.

In a possible design, when the apparatus is a third device, the third device includes a processing module and a transceiver module. The processing module may be, for example, a processor. The transceiver module may be, for example, a transceiver, and the transceiver includes a radio frequency circuit.

Optionally, the third device further includes a storage unit, and the storage unit may be, for example, a memory. When the third device includes the storage unit, the storage unit is configured to store a computer executable instruction, the processing module is connected to the storage unit, and the processing module executes the computer executable instruction stored in the storage unit, so that the third device performs the full-duplex communication method according to any one of the first aspect or the possible implementations of the first aspect.

In another possible design, when the apparatus is a chip in a third device, the chip includes a processing module and a transceiver module. The processing module may be, for example, a processor, and the transceiver module may be, for example, an input/output interface, a pin, or a circuit on the chip. The processing module may execute a computer executable instruction stored in a storage unit, so that the chip in the third device performs the full-duplex communication method according to any one of the first aspect or the possible implementations of the first aspect.

Optionally, the storage unit is a storage unit in the chip, for example, a register or a cache. The storage unit may alternatively be a storage unit that is in the third device and that is located outside the chip, for example, a read-only memory (ROM), another type of static storage device that can store static information and an instruction, or a random access memory (RAM).

Any processor mentioned above may be a general-purpose central processing unit (CPU), a microprocessor, an application-specific integrated circuit (ASIC), or one or more integrated circuits configured to control program execution in the full-duplex communication method in the first aspect.

According to a fifth aspect, this application provides a full-duplex communications apparatus. The apparatus may be a first device, or may be a chip in a first device. The apparatus has a function of implementing the implementations of the second aspect. The function may be implemented by hardware or may be implemented by hardware executing corresponding software. The hardware or software includes one or more units corresponding to the foregoing function.

In a possible design, when the apparatus is a first device, the first device includes a processing module and a transceiver module. The processing module may be, for example, a processor. The transceiver module may be, for example, a transceiver, and the transceiver includes a radio frequency circuit. Optionally, the first device further includes a storage unit, and the storage unit may be, for example, a memory. When the first device includes the storage unit, the storage unit is configured to store a computer executable instruction, the processing module is connected to the storage unit, and the processing module executes the computer executable instruction stored in the storage unit, so that the first device performs the full-duplex communication method according to any one of the second aspect or the possible implementations of the second aspect.

In another possible design, when the apparatus is a chip in a first device, the chip includes a processing module and a transceiver module. The processing module may be, for example, a processor, and the transceiver module may be, for example, an input/output interface, a pin, or a circuit on the chip. The processing module may execute a computer executable instruction stored in a storage unit, so that the chip in the first device performs the full-duplex communication method according to any one of the second aspect or the possible implementations of the second aspect. Optionally, the storage unit is a storage unit in the chip, for example, a register or a cache. The storage unit may alternatively be a storage unit that is in the first device and that is located outside the chip, for example, a ROM, another type of static storage device that can store static information and an instruction, or a RAM.

Any processor mentioned above may be a CPU, a microprocessor, an ASIC, or one or more integrated circuits configured to control program execution in the full-duplex communication method in the second aspect.

According to a sixth aspect, this application provides a full-duplex communications apparatus. The apparatus may be a second device, or may be a chip in a second device. The apparatus has a function of implementing the implementations of the third aspect. The function may be implemented by hardware or may be implemented by hardware executing corresponding software. The hardware or software includes one or more units corresponding to the foregoing function.

In a possible design, when the apparatus is a second device, the second device includes a processing module and a transceiver module. The processing module may be, for example, a processor. The transceiver module may be, for example, a transceiver, and the transceiver includes a radio frequency circuit. Optionally, the second device further includes a storage unit, and the storage unit may be, for example, a memory. When the second device includes the storage unit, the storage unit is configured to store a computer executable instruction, the processing module is connected to the storage unit, and the processing module executes the computer executable instruction stored in the storage unit, so that the second device performs the full-duplex communication method according to any one of the third aspect or the possible implementations of the third aspect.

In another possible design, when the apparatus is a chip in a second device, the chip includes a processing module and a transceiver module. The processing module may be, for example, a processor, and the transceiver module may be, for example, an input/output interface, a pin, or a circuit on the chip. The processing module may execute a computer executable instruction stored in a storage unit, so that the chip in the second device performs the full-duplex communication method according to any one of the third aspect or the possible implementations of the third aspect. Optionally, the storage unit is a storage unit in the chip, for example, a register or a cache. The storage unit may alternatively be a storage unit that is in the second device and that is located outside the chip, for example, a ROM, another type of static storage device that can store static information and an instruction, or a RAM.

Any processor mentioned above may be a CPU, a microprocessor, an ASIC, or one or more integrated circuits configured to control program execution in the full-duplex communication method in the third aspect.

According to a seventh aspect, a communications system is provided. The communications system includes the apparatus in the fourth aspect, the apparatus in the fifth aspect, and the apparatus in the sixth aspect.

According to an eighth aspect, a computer storage medium is provided. The computer storage medium stores program code, and the program code is used to indicate an instruction for performing the method in any one of the first aspect, the second aspect, and the third aspect or any possible implementation of the first aspect, the second aspect, and the third aspect.

According to a ninth aspect, a processor is provided, configured to be coupled to a memory, and perform the method in any one of the first aspect, the second aspect, and the third aspect or any possible implementation of the first aspect, the second aspect, and the third aspect.

According to a tenth aspect, a computer program product including an instruction is provided. When the computer program product is run on a computer, the computer is enabled to perform the method in any one of the first aspect, the second aspect, and the third aspect or any possible implementation of the first aspect, the second aspect, and the third aspect.

Based on the foregoing solutions, while sending the first signal to the first device by using the first transmit sector, the third device receives, by using the first receive sector, the second signal sent by the second device. The coverage area of the third device in the receiving direction may be divided into the at least one receive sector, the at least one receive sector forms one receive sector group, and the third device may receive the second signal by using the first receive sector that is in the receive sector group and that is different from the first transmit sector. In this way, the third device can simultaneously receive a signal and send a signal by using different sectors, to implement full-duplex transmission, and reduce mutual interference between signal sending and signal receiving, thereby improving communication quality of the full-duplex transmission.

DESCRIPTION OF EMBODIMENTS

Figure 1:
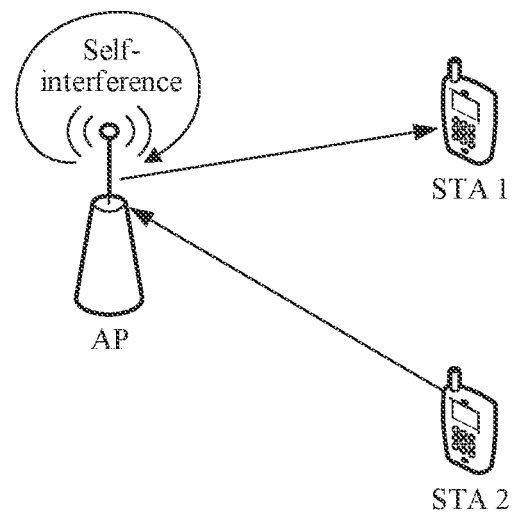
FIG. 1 shows an example application scenario of full-duplex wireless communication.

The following describes technical solutions of this application with reference to accompanying drawings.

The technical solutions of the embodiments of this application may be applied to various communications systems, such as: a wireless fidelity (Wi-Fi) system, a wireless local area network (WLAN) system, a code division multiple access (CDMA) system, a wideband code division multiple access (W WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or a new radio (NR) system.

The first device, the second device, and the third device in the embodiments of this application may be a terminal device. The terminal device may be a user device, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

The first device, the second device, and the third device in the embodiments of this application may be network devices. The network device may be a device configured to communicate with a terminal device. The network device may be a base transceiver station (BTS) in a global system for mobile communications (GSM) or a code division multiple access (CDMA) system, may be a NodeB (NB) in a wideband code division multiple access, (WCDMA) system, may be an evolved NodeB (eNB or eNodeB) in an LTE system, or may be a wireless controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

With a full-duplex, (FD) wireless communications technology, signals in uplink and downlink transmission directions can be simultaneously transmitted on a same radio channel. Theoretically, the full-duplex wireless communications technology achieves spectrum utilization twice as much as a half-duplex mode (for example, a frequency division duplex mode or a time division duplex mode). Full-duplex transmission is classified into two types. One type is full-duplex transmission supported by only an access point, and the other type is full-duplex transmission supported by both an access point and a station. In a full-duplex mode, signal sending and signal receiving need to be simultaneously performed at a same frequency. Therefore, there exists a self-interference problem in the full-duplex mode.

Based on radio link budget analysis, a device in a full-duplex mode can successfully perform full-duplex transmission only after a 110 dB self-interference signal is canceled. Currently, there are three types of self-interference cancelation technologies for canceling a self-interference signal: antenna interference cancelation, radio frequency interference cancelation, and digital interference cancelation. The antenna interference cancelation may be used for canceling a 15 dB self-interference signal, the digital interference cancelation may be used for canceling a 30 dB self-interference signal, and radio frequency interference cancelation needs to be used for canceling the remaining self-interference signal of approximately 70 dB.

FIG. 1 shows an example application scenario of full-duplex wireless communication. As shown in FIG. 1, a full-duplex communications system includes an access point, a station 1, and a station 2. While sending a signal to the station 1, the access point receives a signal from the station 2. The station 1 performs omnidirectional receiving, and the station 2 performs omnidirectional sending.

Figure 2:
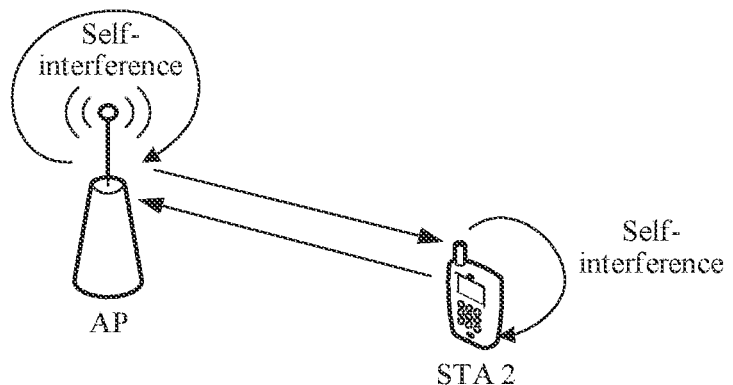
FIG. 2 shows another example application scenario of full-duplex wireless communication.
Figure 3:
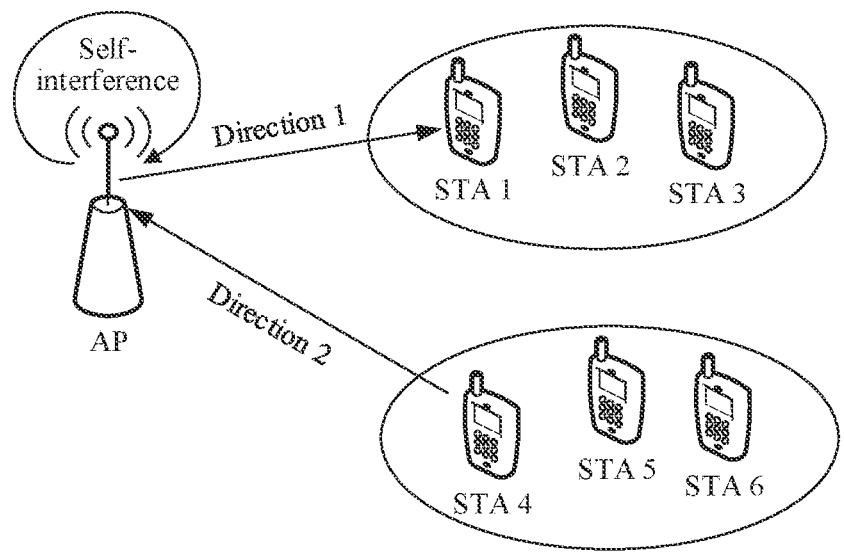
FIG. 3 shows an example application scenario according to an embodiment of this application.

FIG. 2 shows another example application scenario of full-duplex wireless communication. As shown in FIG. 2, a full-duplex communications system includes an access point and a station. Both the access point and the station may simultaneously perform signal sending and signal receiving. FIG. 3 shows still another example application scenario of full-duplex wireless communication. In a full-duplex communications system, there may be a plurality of stations configured to send an uplink signal to an access point, and there may also be a plurality of stations configured to receive a downlink signal sent by the access point. For example, as shown in FIG. 3, while sending a downlink signal to any one or more of a STA 1, a STA 2, and a STA 3, the access point may receive uplink signals sent by any one or more of a STA 4, a STA 5, and a STA 6. It can be understood that quantities of APs and STAs in the foregoing communications system are merely examples, and do not constitute any limitation on the embodiments of this application. In an example, in the embodiments of this application, the third device may be the access point AR the second device may be any station of the STA 4, the STA 5, and the STA 6, and the first device may be any station of the STA 1, the STA 2, and the STA 3.

In a conventional solution, as shown in FIG. 1, while sending a first signal to the station STA 1, the access point can receive a second signal sent by the station STA 2, to implement full-duplex wireless communication. However, on the access point side, the first signal sent by the access point AP causes interference to the received second signal, and on the station STA 1 side, the second signal sent by the station STA 2 causes interference to the first signal received by the station STA 1. Therefore, how to reduce or cancel interference in full-duplex transmission to improve communication quality of the full-duplex transmission is an issue to be urgently resolved.

In the solutions in the embodiments of this application, while sending a first signal to the first device (for example, the STA 4 in FIG. 3) by using a first transmit sector, the third device (for example, the access point AP in FIG. 3) receives, by using a first receive sector, a second signal sent by the second device (for example, the STA 1 in FIG. 3), where the first device is a device paired with the second device. A coverage area of the third device in a receiving direction may be divided into at least one receive sector, the at least one receive sector forms one receive sector group, and the third device may receive the second signal by using the first receive sector that is in the receive sector group and that is different from the first transmit sector. The first device belongs to a first device set corresponding to the first transmit sector, the second device belongs to a second device set corresponding to the first receive sector, and isolation between the first transmit sector and the first receive sector is greater than or equal to a first preset value. According to a method provided in the embodiments of this application, the third device can simultaneously receive a signal and send a signal by using different sectors, to implement full-duplex transmission, and reduce mutual interference between signal sending and signal receiving, thereby improving communication quality of the full-duplex transmission.

The following describes technical solutions of embodiments in this application with reference to accompanying drawings.

It should be noted that, based on an operating principle of a transceiver, "simultaneously" in the embodiments is an essential meaning, and does not need to be strictly specified that there is no time difference in processing on different channels, provided that the foregoing processing is roughly the same in a time dimension on the whole. In addition, in the solutions in the embodiments of this application, it is beneficial that the AP and a plurality of stations simultaneously perform full-duplex communication. For example, this allows the plurality of STAs to receive, within a relatively short time, data sent from the AP and to send data to the AP with a relatively low delay. This also allows the AP to communicate with a relatively large quantity of devices on the whole, and can also implement more efficient bandwidth utilization.

Figure 4A:
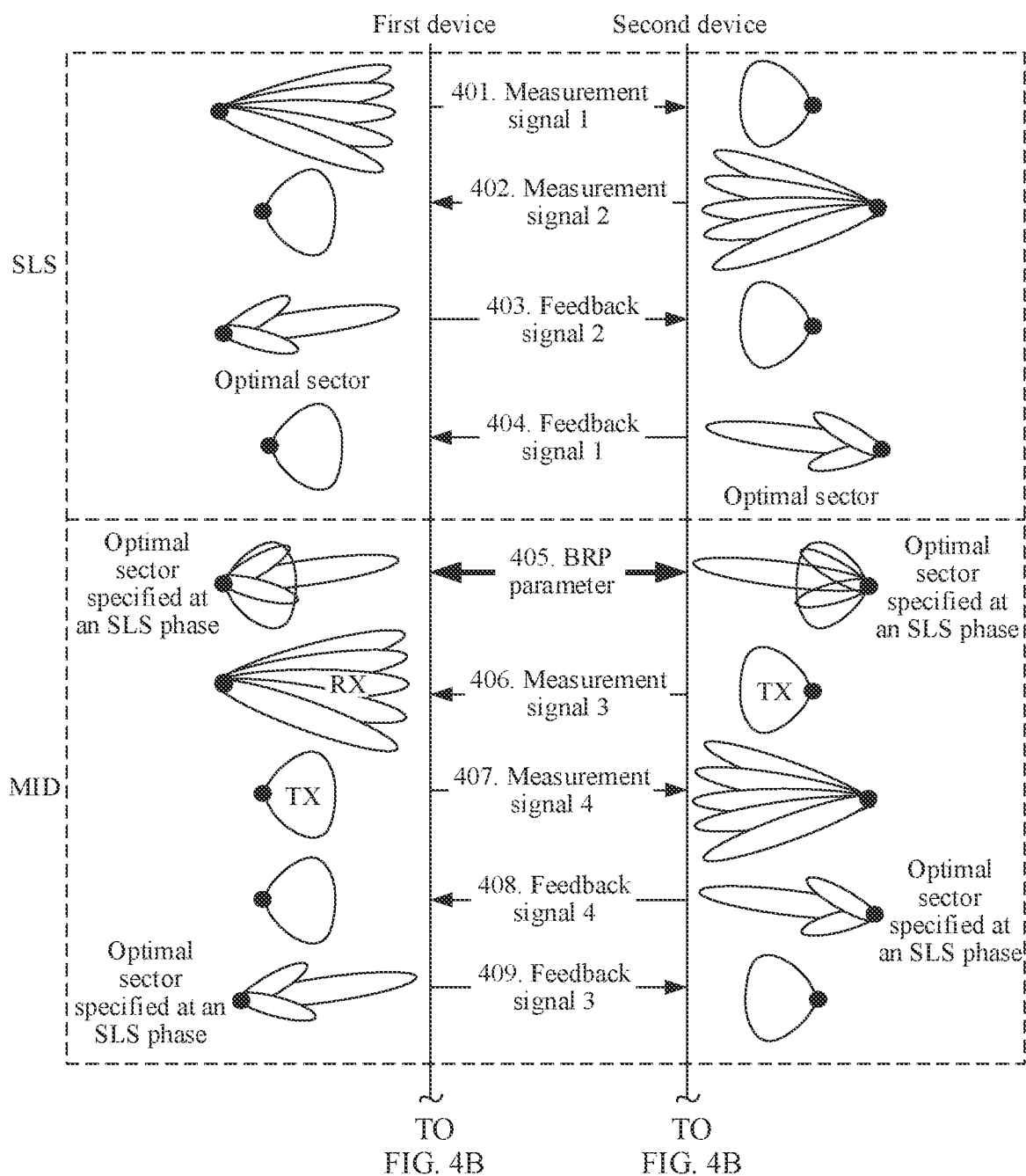
FIG. 4A and FIG. 4B show a beamforming training process.
Figure 4B:
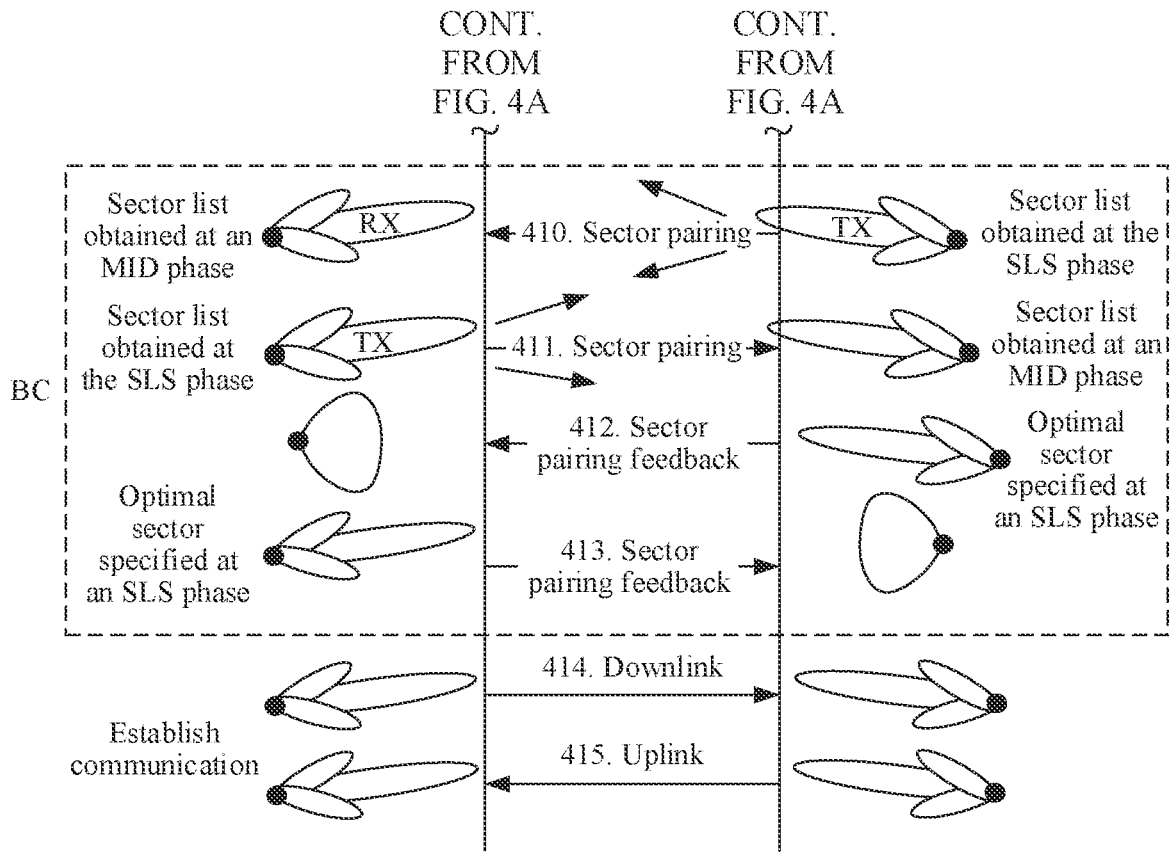

In a high-frequency wireless local area network (Wi-Fi) application scenario, to cancel radio frequency interference, a data sender/receiver needs to concentrate a sending direction or a receiving direction of the data sender/receiver within a relatively small angle range; and to implement signal receiving and sending, a direction of a transmit sector of the sender needs to be able to cover a direction of a receive sector of the receiver, that is, the transmit sector can be aligned with the receive sector. FIG. 4A and FIG. 4B show a process of sector alignment between two devices. The process may be referred to as a beamforming training process.

401. A first device sends a measurement signal 1 to a second device.

The first device sends the measurement signal 1 to the second device by using a plurality of transmit sectors. Correspondingly, the second device receives the measurement signal 1, detects signal quality of the measurement signal 1, and determines an optimal transmit sector of the first device.

It should be understood that the measurement signal 1 may carry a sector identifier of the transmit sector used by the first device.

402. The second device sends a measurement signal 2 to the first device.

The second device sends the measurement signal 2 to the first device by using a plurality of transmit sectors. Correspondingly, the first device receives the measurement signal 2, detects signal quality of the measurement signal 2, and determines an optimal transmit sector of the second device.

It should be understood that the measurement signal 2 may carry a sector identifier of the transmit sector used by the second device.

It should also be understood that a sequence of step 401 and step 402 is not limited.

403. The first device sends a feedback signal 2 to the second device.

The first device adds an identifier of the optimal transmit sector determined in step 402 to the feedback signal 2, and sends the feedback signal 2 to the second device.

404. The second device sends a feedback signal 1 to the first device.

The second device adds an identifier of the optimal transmit sector, determined in step 401, of the first device to the feedback signal 1, and sends the feedback signal 1 to the first device.

It should be understood that step 404 may be performed before step 402 or step 403.

It should also be understood that steps 401 to 404 may implement "sector-level sweep (SLS)". Both the measurement signal 1 and the measurement signal 2 may be sector sweep frames.

405. The first device and the second device may interact with each other by using a beam refinement protocol (BRP) parameter, to determine whether an optimal receive sector needs to be determined (this process may implement a "multiple sector identifier (MID)" phase), and whether pairing between an optimal receive sector and an optimal transmit sector needs to be determined (this process may implement beam combining (BC)).

406. If determining that beam refinement needs to be performed, the second device sends a measurement signal 3 to the first device, and determines at least one optimal receive sector of the first device.

407. The first device sends a measurement signal 4 to the second device, and determines at least one optimal receive sector of the second device.

408. The second device sends a feedback signal 4 to the first device, where the feedback signal 4 carries an identifier of the at least one optimal receive sector of the second device.

409. The first device sends a feedback signal 3 to the second device, where the feedback signal 3 carries an identifier of the at least one optimal receive sector of the first device.

410 to 413. The first device and the second device perform sector pairing, and notify each other of a pairing result.

414. The first device sends a signal by using the optimal transmit sector of the first device, and the second device receives a signal by using a receive sector paired with the transmit sector.

415. The second device sends a signal by using the optimal transmit sector of the second device, and the first device receives a signal by using a receive sector paired with the transmit sector.

Figure 5:
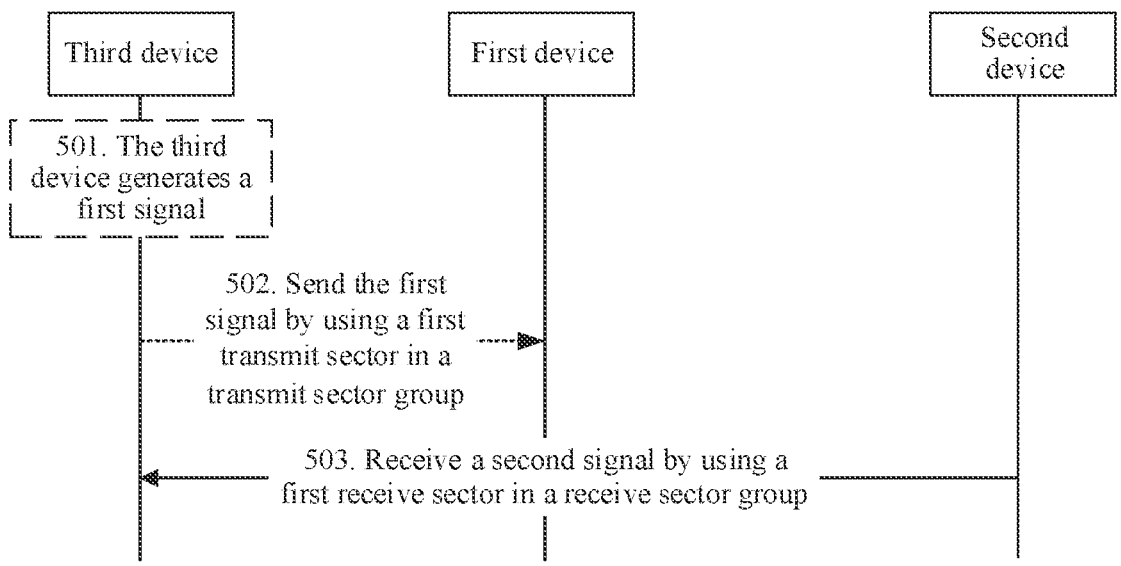
FIG. 5 is a schematic flowchart of a full-duplex communication method according to an embodiment of this application.

FIG. 5 is a schematic flowchart of a full-duplex communication method according to an embodiment of this application.

501. A third device generates a first signal.

Optionally, the third device may be a network device or a terminal device, may be the AP in FIG. 1 or FIG. 3 or the AP in FIG. 2, or may be the STA having a full-duplex capability in FIG. 2. This is not limited in this application.

502. The third device sends a first signal by using a first transmit sector in a transmit sector group.

Specifically, a coverage area of the third device in a sending direction may be divided into at least one transmit sector, the at least one transmit sector forms one transmit sector group, and the third device may send the first signal by using any transmit sector in the transmit sector group. For ease of description, the following embodiment provides descriptions by using an example in which the third device sends the first signal by using a first sector.

503. When sending the first signal to a first device by using the first transmit sector, the third device receives, by using a first receive sector in a receive sector group, a second signal sent by a second device, where the first transmit sector is different from the first receive sector.

Specifically, while sending the first signal to the first device by using the first transmit sector, the third device receives, by using the first receive sector, the second signal sent by the second device. In a preferred case, a time domain unit in which the third device sends the first signal by using the first transmit sector may be the same as a time domain unit in which the third device receives the second signal by using the first receive sector. A coverage area of the third device in a receiving direction may be divided into at least one receive sector, the at least one receive sector forms one receive sector group, and the third device may receive the second signal by using the first receive sector that is in the receive sector group and that is different from the first transmit sector. In this way, the third device can simultaneously receive a signal and send a signal by using different sectors, to implement full-duplex transmission, and reduce mutual interference between signal sending and signal receiving, thereby improving communication quality of the full-duplex transmission.

It should be noted that, the time domain unit in which the third device sends the first signal by using the first transmit sector is the same as the time domain unit in which the third device receives the second signal by using the first receive sector, or the time domain units may completely overlap each other, or the time domain units may be partially overlap each other. In an example, the time domain unit is one slot, and the slot includes seven OFDM symbols. The first signal occupies the first five OFDM symbols, and the second signal occupies the last five OFDM symbols. In other words, there are three overlapping OFDM symbols among the OFDM symbols occupied by the first signal and the OFDM symbols occupied by the second signal.

In another example, alternatively, there may be an intersection between transmission duration of the first signal and a transmission duration of the second signal. For example, the transmission duration of the first signal is [T1, T2], where T1 is a transmission start time of the first signal, and T2 is a transmission end time of the first signal; and the transmission duration of the second signal is [T3, T4], where T3 is a transmission start time of the second signal, and T4 is a transmission end time of the second signal. There is an intersection between the transmission duration of the first signal and the transmission duration of the second signal. For example, T3 is included in a time interval of [T1, T2], or T1 may be included in a time interval of the transmission time [T3, T4] of the second signal, or both T3 and T4 may be included in a time interval of [T1, T2].

It can be understood that there are many cases in which the time domain units completely or partially overlap each other or there is an intersection between the transmission duration. The foregoing examples do not constitute any specific limitation on this embodiment of this application.

It should be understood that the time domain unit may be a frame, a subframe, a slot, a mini-slot, an orthogonal frequency division multiplexing (OFDM) symbol, or the like.

It should be noted that the coverage area of the third device in the sending direction may be the same as or different from the coverage area of the third device in the receiving direction. Division manners for a transmit sector and a receive sector may be the same or may be different. This is not limited in this application.

For example, when the coverage area of the third device in the sending direction is the same as the coverage area of the third device in the receiving direction, and the division manners for a transmit sector and a receive sector are also the same, that the first transmit sector is different from the first receive sector may mean that the first transmit sector is not the same as the first receive sector.

Optionally, that the first transmit sector is different from the first receive sector may be that the first transmit sector does not overlap the first receive sector.

It should be understood that the first signal and the second signal may be the same or may be different. This is not limited in this application.

Optionally, the first device may be a network device, a terminal device, or any one of the STA 4, the STA 5, and the STA 6 in FIG. 3. This is not limited in this application.

It should be noted that the first device may alternatively be a device that has a full-duplex capability, but a full-duplex communication function thereof is not enabled.

Optionally, the second device may be a network device or a terminal device, or may be the STA 2 in FIG. 1 or any one of the STA 1, the STA 2, and the STA 3 in FIG. 3. This is not limited in this application.

It should be noted that the second device may alternatively be a device that has a full-duplex capability, but a full-duplex communication function thereof is not enabled; and when the second device does not perform full-duplex transmission currently, the second device does not receive a signal.

Optionally, each transmit sector in the transmit sector group is corresponding to one device set, and each receive sector in the receive sector group is corresponding to one device set.

It should be noted that device sets corresponding to some transmit sectors in the transmit sector group may not include any device, and device sets corresponding to some receive sectors in the receive sector group may not include any device. This is not limited in this application. For example, the third device includes three transmit sectors: a transmit sector 1, a transmit sector 2, and a transmit sector 3; and a device set corresponding to the transmit sector 1 includes a STA 1, a STA 2, and a STA 3, a device set corresponding to the transmit sector 2 includes a STA 4, a STA 5, and a STA 6, while a device set corresponding to the transmit sector 3 does not include any device.

It should be understood that device sets corresponding to different transmit sectors may include same devices, and device sets corresponding to different receive sectors may also include same devices.

It should also be understood that some devices included in a device set corresponding to a transmit sector may be the same as some devices included in a device set corresponding to a receive sector. This is not limited in this application.

Optionally, isolation between sectors to which two devices configured to perform full-duplex transmission with the third device belong is greater than or equal to a preset value.

Specifically, the isolation may be a degree of signal attenuation of a signal sent by the third device by using a transmit sector relative to the signal received by the third device by using a receive sector.

In an example, a signal attenuation degree may be a difference between signal quality S1 of a signal sent by using a transmit sector and signal quality S2 of the signal received by using a receive sector, and the signal quality may be signal power. For example, if signal quality of a signal 1 sent by the third device by using a transmit sector is S1, and signal quality of the signal 1 received by the third device by using a receive sector is S2, isolation is S1-S2.

In another example, a signal attenuation degree may alternatively be a ratio of signal quality S1 of a signal sent by using a transmit sector and signal quality S2 of the signal received by using a receive sector, and the signal quality may be signal power. For example, if signal quality of a signal 1 sent by the third device by using a transmit sector is S1, and signal quality of the signal 1 received by the third device by using a receive sector is S2, isolation is S1/S2.

It should be understood that, that the isolation is greater than or equal to a first preset value indicates that a degree of signal attenuation of a signal sent by the third device by using a transmit sector relative to the signal received by the third device by using a receive sector is greater than or equal to the first preset value. The third device can reduce self-interference by using the isolation, to improve communication quality of uplink and downlink transmission simultaneously performed by the third device.

It should be noted that the "isolation" may also be referred to as "separation degree", "isolation degree", or the like. This is not specifically limited in this embodiment of this application.

It should be understood that the isolation may be obtained by an internal test on the third device.

It should be noted that the isolation may be set to greater than the first preset value, or set to greater than or equal to the first preset value, or set to equal to the first preset value.

Optionally, the first device may be a device in a first device set, and the first device set is a device set corresponding to the first transmit sector. The second device may be a device in a second device set, and the second device set is a device set corresponding to the first receive sector.

In this embodiment of this application, there are at least two grouping manners for a device that communicates with the third device. In a first grouping manner, the device that communicates with the third device is grouped into at least one device set based on an optimal transmit sector. In a second grouping manner, the device that communicates with the third device is grouped into at least one device set based on an optimal receive sector. One device may be grouped into both a device set in the first grouping manner and a device set in the second grouping manner.

The first device set is a device set in the first grouping manner, and the first transmit sector is an optimal transmit sector of a device in the first device set. The second device set is a device set in the second grouping manner, and the first receive sector is an optimal receive sector of a device in the second device set.

It can be understood that when sending a signal to a device in the first device set by using an optimal transmit sector, the third device can achieve optimal communication quality. When receiving, by using an optimal receive sector, a signal sent by a device in the second device set, the third device can achieve optimal communication quality.

In this application, both a transmit sector and a receive sector are specific to the third device. To be specific, the transmit sector is a sector used when the third device sends a signal to another device, and a receive sector is a sector used when the third device receives a signal sent by another device.

Optionally, the third device may perform beam training for each transmit sector in the transmit sector group, to obtain a device set corresponding to the transmit sector.

Specifically, the third device broadcasts a first measurement signal by using each transmit sector, and a device that receives the first measurement signal determines a transmit sector corresponding to the first measurement signal with best signal quality, where each first measurement signal carries a number of a transmit sector used by the third device. The receiving device determines a number of at least one optimal transmit sector based on quality of the received first measurement signal, and feeds back the number of the at least one optimal transmit sector to the third device, for example, adds the number of the at least one optimal transmit sector to a first feedback signal. The receiving device may further add, to the first feedback signal, an identifier of the device that sends the first feedback signal. In this way, the third device can receive first feedback signals fed back by a plurality of devices, and each first feedback signal carries a number of at least one optimal transmit sector and an identifier of a device that sends the first feedback signal. The third device determines, based on the number of the at least one optimal transmit sector carried in the first feedback signal, a device set corresponding to each transmit sector.

In an example, the third device may determine that devices that add a same number of optimal transmit sectors to first feedback signals belong to a same device set. For example, as shown in FIG. 3, it is assumed that the third device (for example, an access point AP) includes two transmit sectors, and receives first feedback signals sent by the STA 1, the STA 2, the STA 3, the STA 4, the STA 5, and the STA 6. Numbers of optimal transmit sectors fed back by the STA 1, the STA 2, and the STA 3 are all a 1, and numbers of optimal transmit sectors fed back by the STA 4, the STA 5, and the STA 6 are all a 2. In this case, the third device determines that devices included in a device set corresponding to the transmit sector 1 are the STA 1, the STA 2, and the STA 3 and that a device set corresponding to the transmit sector 2 includes the STA 4, the STA 5, and the STA 6.

It should be understood that each device may be grouped into at least one device set corresponding to a transmit sector.

It should be understood that the third device broadcasts the first measurement signal by using each transmit sector, and the device that receives the first measurement signal may determine, based on signal quality of the received first measurement signal sent by using the at least one transmit sector, at least one optimal transmit sector used for communication between the device and the third device. In an example, the device that receives the first measurement signal may sort signal quality of the received first measurement signal, and determine, as the at least one optimal transmit sector, a transmit sector corresponding to the first N received first measurement signals whose signal quality is relatively high.

In another example, the device that receives the first measurement signal may determine, as the at least one optimal transmit sector based on signal quality of the received first measurement signal sent by using the at least one transmit sector, at least one transmit sector corresponding to the first measurement signal whose signal quality is greater than or equal to a second preset value.

In another example, the device that receives the first measurement signal may alternatively determine, as an optimal transmit sector based on signal quality of the received first measurement signal sent by using the at least one transmit sector, a transmit sector corresponding to the first measurement signal with highest signal quality.

For example, the third device may perform beam training according to step 401 and step 404 in FIG. 4A and FIG. 4B for a transmit sector.

It should be understood that the first feedback signal may carry a number of one optimal transmit sector, or may carry numbers of a plurality of optimal transmit sectors. This is not limited in this application.

It should also be understood that this embodiment of this application may be applied to a low-frequency scenario, or may be applied to a high-frequency scenario. This is not limited in this application.

Optionally, the third device may perform beam training for each receive sector in the receive sector group, to obtain a device set corresponding to the receive sector.

Specifically, a device in a communications system omnidirectionally sends at least one second measurement signal to the third device, where the second measurement signal may carry an identifier of a device that sends the second measurement signal; and the third device receives the at least one second measurement signal by using each receive sector in the receive sector group, and further determines at least one optimal receive sector used for communication between the third device and the device. In this way, the third device can determine at least one optimal receive sector used for communication between the third device and each of a plurality of devices in the communications system. Further, the third device may determine that at least one device is corresponding to a receive sector, that is, the at least one device forms a device set corresponding to the receive sector.

In an example, the third device may determine devices corresponding to a same number of optimal receive sectors as devices belonging to a same device set. For example, as shown in FIG. 3, it is assumed that the third device (for example, an access point AP) includes two receive sectors, and receives second measurement signals sent by the STA 1, the STA 2, the STA 3, the STA 4, the STA 5, and the STA 6. The third device determines, based on the second measurement signals, that numbers of optimal receive sectors corresponding to the STA 1, the STA 2, and the STA 3 are all a 2 and that numbers of optimal receive sectors corresponding to the STA 4, the STA 5, and the STA 6 are all a 1. In this case, the third device determines that devices included in a device set corresponding to the receive sector 2 are the STA 1, the STA 2, and the STA 3 and that a device set corresponding to the receive sector 1 includes the STA 4, the STA 5, and the STA 6.

It should be understood that the third device may determine, based on signal quality of a second measurement signal received by using a receive sector, at least one optimal receive sector used for communication between the third device and a device. In an example, the determining at least one optimal receive sector used for communication between the third device and a device may be: sorting, by the third device, signal quality of at least one received second measurement signal, and determining a receive sector used for receiving the first N second measurement signals with optimal signal quality as the at least one optimal receive sector. In another example, the third device may determine a receive sector, used for receiving a second measurement signal with signal quality greater than or equal to a third preset value, in receive sectors as at least one optimal receive sector. In still another example, the third device may determine a receive sector, used for receiving a second measurement signal with highest signal quality, in receive sectors as an optimal receive sector.

For example, the third device may perform beam training according to step 406 in FIG. 4A and FIG. 4B for a receive sector.

It should be understood that each of the plurality of devices in the communications system is grouped into at least a device set corresponding to one receive sector.

Optionally, the third device may send a second feedback signal to notify an optimal receive sector used for communication between a device that sends a second measurement signal and the third device, for example, by using step 409 in FIG. 4A and FIG. 4B.

It should be understood that the second preset value may be the same as or different from the third preset value. This is not limited in this application.

Optionally, the third device performs pairing on all transmit sectors and all receive sectors, and determines pairing relationships between the transmit sectors and the receive sectors.

Specifically, the third device may perform pairing on the receive sectors and the transmit sectors based on isolation between sectors. In an example, the third device may define a case in which isolation between sectors to which two devices configured to perform full-duplex transmission with the third device belong is greater than or equal to a preset value, as that there is a pairing relationship between the two sectors. The third device performs full-duplex transmission by using devices in device sets corresponding to two paired sectors. This not only can improve quality of a signal received by the third device, but also can improve quality of a downlink signal received by a peer end, that is, improve communication quality of the entire communications system.

For example, an AP covers two transmit sectors and two receive sectors, and is associated with six stations in total. After beam training is performed, devices included in a device set corresponding to each transmit sector in a transmit sector group and a device set corresponding to each receive sector in a receive sector group may be as follows.

A device set corresponding to a transmit sector 1 includes a station 1, a station 2, and a station 3. A device set corresponding to a transmit sector 2 includes a station 4, a station 5, and a station 6. A device set corresponding to a receive sector 1 includes the station 4, the station 5, and the station 6. A device set corresponding to a receive sector 2 includes the station 1, the station 2, and the station 3. In other words, the AP can achieve optimal communication quality when sending data to the station 1, the station 2, and the station 3 by using the transmit sector 1; and the AP can achieve optimal communication quality when receiving, by using the receive sector 1, data sent by the station 4, the station 5, and the station 6. The AP may specify that there is a pairing relationship between the transmit sector 1 and the receive sector 1. For example, as shown in FIG. 3, the device set corresponding to the transmit sector 1 includes the STA 1, the STA 2, and the STA 3 in FIG. 3; and the device set corresponding to the receive sector 1 includes the STA 4, the STA 5, and the STA 6 in FIG. 3.

It should be understood that a station associated with the AP can be understood as a station that can be managed by the AP.

It should also be understood that the second device may send a third measurement signal in a broadcast manner, or may send a third measurement signal to a device in the first device set. This is not limited in this application. In addition, the second device may further send the third measurement signal to the third device.

Optionally, the second device may send a third measurement signal; a device that is in the first device set and that receives the third measurement signal generates a third feedback signal, and sends the third feedback signal; and the third device may determine, based on at least one received third feedback signal, a device paired with the second device.

Specifically, the third measurement signal may carry an identifier of the second device, and the identifier of the second device may be a sending address for sending the third measurement signal, or may be another identifier of the second device, or may be an association identifier of the second device. Alternatively, there is a correspondence between the third measurement signal and the second device, and after receiving the third measurement signal, the device in the first device set can determine the device that sends the third measurement signal. The device that is in the first device set and that receives the third measurement signal generates the third feedback signal based on the third measurement signal, and sends the third feedback signal to the third device. The third device selects, from the first device set based on the received third feedback signal, the first device as a required paired device. In addition, the third feedback signal carries a device identifier of the second device, and the identifier of the second device may be an association identifier of the second device that sends the third measurement signal. In this way, the third device can determine, based on the device identifier, that the first device is a device paired with the second device corresponding to the device identifier. For example, the third feedback signal carries an ID of the second device, and the third device can determine, based on the ID, whether the first device is paired with the second device.

Optionally, the third measurement signal may be a null data packet (NDP) frame, a data frame, or another frame. This is not limited in this application.

It should be understood that the first measurement signal, the second measurement signal, and the third measurement signal may be the same, or may be partially the same, or may be completely different. This is not limited in this application.

Optionally, the third feedback signal may further carry an identifier of the device that sends the third feedback signal. In this way, the third device selects, from the first device set based on the received third feedback signal, a device that sends no third feedback signal as a device paired with the second device, that is, the first device paired with the second device is a device that sends no third feedback signal. In other words, the first device does not receive the third measurement signal sent by the second device, that is, interference caused by the second device to the first device is relatively small. Therefore, the third device uses the first device as a device paired with the second device, thereby improving communication quality of downlink signal transmission of the third device.

For example, as shown in FIG. 3, if the second device is the STA 4, the first device set includes the STA 1, the STA 2, and the STA 3, the STA 4 sends a third measurement signal, and both the STA 1 and the STA 3 send third feedback signals to the AP, that is, a device that is in the first device set and that sends no third feedback signal is the STA 2, the AP uses the STA 2 as a station paired with the STA 4.

It should be understood that if the first device set includes a plurality of devices that send no third feedback signal, the third device may determine at least one of the plurality of devices as a device paired with the second device.

Optionally, the first device may detect the third measurement signal, and generate a third feedback signal based on the third measurement signal whose signal quality is greater than or equal to a preset quality threshold.

Optionally, the device that is in the first device set and that receives the third measurement signal may perform signal quality detection on the third measurement signal to generate a detection result, add the detection result to the third feedback signal, and send the third feedback signal to the third device; and the third device may determine a device that is in the first device set and that is corresponding to a worst detection result as a device paired with the second device.

Specifically, when each device in the first device set receives the third measurement signal, the device that receives the third measurement signal may add a detection result of the third measurement signal to a third feedback signal; and the third device determines a device corresponding to a signal with lowest signal quality in the detection result as a device paired with the second device.

Optionally, the third device may determine, as a device paired with the second device, a device that is in the first device set and that is corresponding to the first N signals in signals in ascending order of signal quality, where N≥1.

It should be noted that a specific value of N may be flexibly set.

Optionally, the third device may determine, as a device paired with the second device, a device that is in the first device set and that is corresponding to a signal whose signal quality is greater than or is greater than or equal to a preset quality threshold.

Optionally, the second device may periodically send the third measurement signal to each device in the first device set, and a device that receives the third measurement signal may also periodically send a third feedback signal.

Optionally, the third device may send a trigger signal. The trigger signal may be used to trigger only the second device to send the third measurement signal, or may be used to trigger only a device in the first device set to send a third feedback signal after the device receives the third measurement signal, or the trigger signal is not only used to trigger the second device to send the third measurement signal, but also used to trigger a device in the first device set to send a third feedback signal after the device receives the third measurement signal. In other words, the third device may send the trigger signal depending on a requirement, thereby avoiding an unnecessary waste and reducing signaling overheads.

It should be understood that the third device may send one trigger signal to trigger sending of the third measurement signal and the third feedback signal, or may send two trigger signals to respectively trigger sending of the third measurement signal and the third feedback signal. This is not limited in this application.

Optionally, the third device may send a pairing relationship, where the pairing relationship includes a pairing relationship between the first transmit sector and the first receive sector, the first receive sector is corresponding to the second device set, and the first transmit sector is corresponding to the first device set.

Specifically, the pairing relationship may include pairing relationships between all transmit sectors in the transmit sector group and all receive sectors in the receive sector group, or may include only a pairing relationship between the first transmit sector and the first receive sector.

It should be understood that the third device may send the pairing relationship in a broadcast manner, or may send the pairing relationship to one or more specific devices. For example, the third device may send the pairing relationship to the second device, or send the pairing relationship to the first device. This is not limited in this application.

It should be understood that in the beamforming training process shown in FIG. 4A and FIG. 4B, for example, the first device that has undergone the beamforming training process may determine the optimal transmit sector, corresponding to the device, of the third device by using step 401 and step 404 in FIG. 4A and FIG. 4B, and correspondingly may determine that the device belongs to a device set corresponding to the optimal transmit sector; and the device may determine the optimal receive sector, corresponding to the device, of the third device by using step 406 and step 409 in FIG. 4A and FIG. 4B, and correspondingly may determine that the device belongs to a device set corresponding to the optimal receive sector. Therefore, the device that receives the pairing relationship may determine, with reference to the foregoing information known in the beamforming training process, a pairing relationship between the device set to which the device belongs and another device set based on the pairing relationship between the first transmit sector and the first receive sector. For example, as shown in FIG. 3, a pairing relationship sent by the third device is a pairing relationship between a transmit sector 1 and a receive sector 1. The STA 1 determines, according to step 401 and step 404, that a corresponding optimal transmit sector of the third device is the transmit sector 1. After step 406 and step 409 are performed, the STA 1 determines that a corresponding optimal receive sector of the third device is a receive sector 2. It can be learned from the pairing relationship that the STA 1 is included in a first device set corresponding to the transmit sector 1, and the first device set to which the STA 1 belongs is paired with a second device set corresponding to the receive sector 1.

Optionally, the third measurement signal sent by the second device may further carry an identifier of a receive sector corresponding to the device set to which the second device belongs. It should be understood that the third measurement signal that carries the identifier of the receive sector corresponding to the device set to which the second device belongs may be sent by the second device in a broadcast manner, or may be sent by the second device to each device in the first device set. This is not limited in this application. When the second device sends the third measurement signal to a device in the first device set, a device that is in the communications system and that does not belong to the first device set corresponding to a transmit sector paired with the receive sector may not send a third feedback signal to the third device, that is, the device that receives the third measurement signal may determine whether the device belongs to the first device set. A device that belongs to the first device set corresponding to the transmit sector paired with the identifier of the receive sector sends a third feedback signal only in this case, thereby further reducing system overheads. The device that belongs to the first device set corresponding to the transmit sector paired with the identifier of the receive sector listens to the third measurement signal and may calculate received signal quality or a signal-to-noise ratio, only when the second device broadcasts the third measurement signal; while a device that does not belong to the first device set does not need to listen to the third measurement signal, thereby reducing an energy loss and overheads of another device. Optionally, the second device may determine, based on a receive sector corresponding to the device set to which the second device belongs and a pairing relationship, a transmit sector, paired with the receive sector, of the third device, and add an identifier of the transmit sector to the third measurement signal. In this way, a device that receives the third measurement signal sends a feedback signal to the third device only when determining that the device belongs to a device set corresponding to the transmit sector indicated by the identifier of the transmit sector, thereby reducing signaling overheads.

Optionally, the third measurement signal may further include an identifier of a data packet in which the third measurement signal is located. The identifier may be a token number of the data packet, and helps a device that receives the third measurement signal to identify a data packet in which each third measurement signal is located. Further, if the device that receives the third measurement signal adds a token ID of the third measurement signal to a third feedback signal and sends the third feedback signal to the third device, the third device may determine, based on the token ID of the third measurement signal, a specific measurement signal for which the feedback signal provides a feedback, thereby ensuring feedback effectiveness and accuracy.

Figure 6:
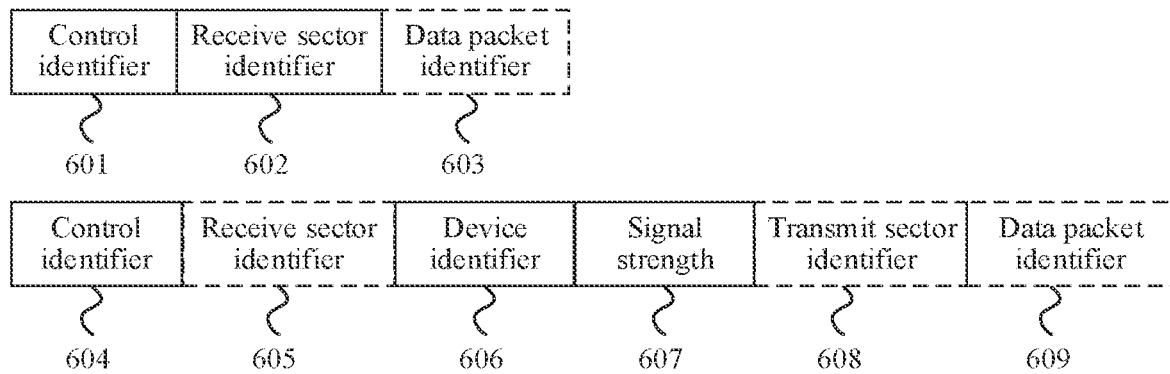
FIG. 6 is a schematic structural diagram of a data frame according to an embodiment of this application.

FIG. 6 shows two example data structures. A first structure may be an example data structure of information included in a third measurement signal. The first structure includes a control identifier field 601 and a receive sector identifier field 602. Optionally, the first structure further includes a data packet identifier field 603.

The control identifier field 601 is used to identify different media access control (MAC) headers. It can be understood that a control identifier in a frame structure of the third measurement signal is different from a control identifier in a frame structure of a third feedback signal.

The receive sector identifier field 602 is used to indicate an optimal receive sector corresponding to a device that sends the third measurement signal. In an example, the identifier field 602 may be an identifier (ID) of the optimal receive sector.

The data packet identifier field 603 is used to identify a data packet in which the third measurement signal is located. In an example, a data packet identifier may be a token number of the data packet, that is, a token ID, and helps a device that receives the third measurement signal to identify, a data packet in which each third measurement signal is located. Further, during sending of a third feedback signal, if the token ID is sent to a third device by being carried in the third feedback signal, the third device may determine, based on the token ID, a specific measurement signal for which the feedback signal provides a feedback, thereby ensuring feedback effectiveness and accuracy.

Optionally, the third feedback signal may include an identifier of a data packet in which the third feedback signal is located, so that the third device can determine validity of the data packet, thereby avoiding using the third measurement signal in a data packet with a relatively high delay to determine a device paired with a second device, and improving effectiveness of determining a paired device. The third feedback signal may further carry an identifier of the data packet in which the third measurement signal is located, so that the third device determines, based on the identifier of the data packet in which the third measurement signal is located, a specific measurement signal for which the feedback signal provides a feedback, thereby ensuring feedback effectiveness and accuracy.

Optionally, the third feedback signal may further carry an identifier of a transmit sector. In this way, the third device can select, from a device set corresponding to the transmit sector indicated by the identifier of the transmit sector, a device paired with the second device, thereby avoiding that the third device needs to detect which device set a device that sends the third feedback signal belongs to, and reducing power consumption of the third device.

Optionally, the third feedback signal may further carry signal quality of the received measurement signal, and the signal quality may be power, energy, or a signal-to-noise ratio of the received signal, so that the third device determines, based on the signal quality, a device that is paired with a device that sends the measurement signal.

Optionally, the third feedback signal may further carry an identifier of a device that sends the third measurement signal. In this way, after receiving the third feedback signal, the third device can determine, based on the device identifier, the third feedback signal provides a feedback for a measurement signal sent by which device, so that the third device determines a device paired with the device that sends the third measurement signal.

A second structure shown in FIG. 6 may be an example structure of information included in a third feedback signal. The second structure includes a control identifier field 604, a device identifier field 606, and a signal quality field 607. Optionally, the second structure may further include a receive sector identifier field 605, a transmit sector identifier field 608, and a data packet identifier field 609.

The control identifier field 604 carried in the third feedback signal is used to identify different MAC headers.

The device identifier field 606 is used to indicate a device that sends the third measurement signal, and may be an identifier of the device that sends the third measurement signal. The identifier may be a MAC address and an association identifier (AID) of the device that sends the third measurement signal.

The signal quality field 607 may be used to indicate signal quality of the received third measurement signal. The signal quality may be signal power or a received signal level of the received third measurement signal, or may be a ratio of the received signal to noise, that is, a signal-to-noise ratio.

The receive sector identifier field 605 may be used to indicate a receive sector that is paired with a transmit sector corresponding to a device that sends the third feedback signal. In an example, the receive sector identifier field 605 is a sector ID. In this way, after receiving the third feedback signal, the third device can determine, based on the field, the third feedback signal provides a feedback for a measurement signal sent by a device in a device set corresponding to which receive sector.

The transmit sector identifier field 608 may be used to indicate a transmit sector corresponding to the device that sends the third feedback signal. In an example, a transmit sector identifier may be an ID of a transmit sector. In this way, the third device can select, from a device set corresponding to the transmit sector indicated by the identifier of the transmit sector, a device paired with the second device, thereby avoiding that the third device needs to detect which device set the device that sends the third feedback signal belongs to, and reducing power consumption of the third device.

The data packet identifier field 609 may be used to identify a data packet in which the third feedback signal is located. In an example, an identifier may be a token number of the data packet, that is, a token ID. The data packet identifier may alternatively be an identifier of a data packet in which the third measurement signal is located, so that the third device determines, based on the identifier of the data packet in which the third measurement signal is located, a specific measurement signal for which the feedback signal provides a feedback, thereby improving feedback effectiveness and accuracy.

Optionally, the receive sector identifier field 602 and the data packet identifier field 603 may be carried in a media access control MAC header of the third measurement signal. In an example, the receive sector identifier field 602 and the data packet identifier field 603 are carried in an aggregation control field in the MAC header of the third measurement signal.

Optionally, the receive sector identifier field 605, the device identifier field 606, the signal quality field 607, the transmit sector identifier field 608, and the data packet identifier field 609 may be carried in a MAC header of the third feedback signal. In an example, these fields may be carried in an aggregation control field in the MAC header of the third feedback signal.

Therefore, according to the full-duplex communication method in this embodiment of this application, while sending the first signal to the first device by using the first transmit sector, the third device receives, by using the first receive sector, the second signal sent by the second device. A coverage area of the third device in a receiving direction may be divided into at least one receive sector, the at least one receive sector forms one receive sector group, and the third device may receive the second signal by using the first receive sector that is in the receive sector group and that is different from the first transmit sector. In this way, the third device can simultaneously receive a signal and send a signal by using different sectors, to implement full-duplex transmission, and reduce mutual interference between signal sending and signal receiving, thereby improving communication quality of the full-duplex transmission.

Figure 7:
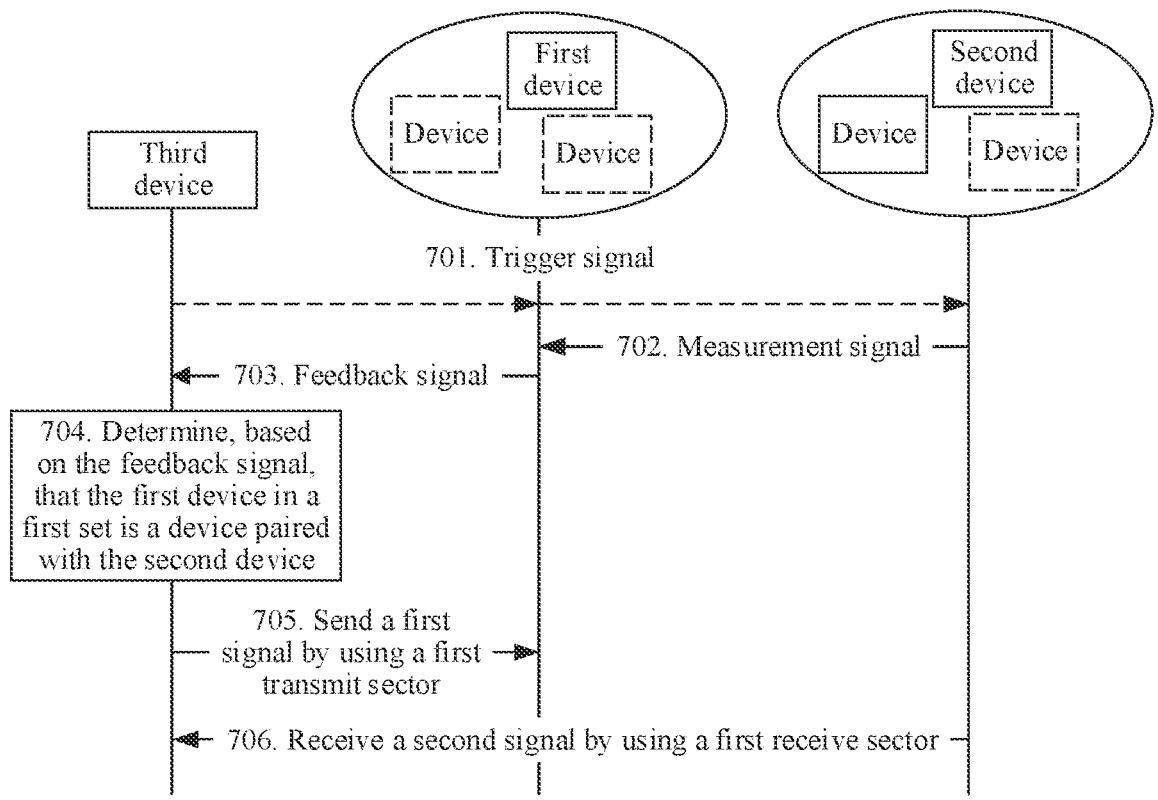
FIG. 7 is a schematic flowchart of a full-duplex communication method according to an embodiment of this application.

FIG. 7 is a schematic flowchart of a specific embodiment of this application.

It should be understood that meanings indicated by same terms in this embodiment of this application and the embodiments shown in FIG. 5 and FIG. 6 are the same. To avoid repetition, details are not described herein again.

701. A third device sends a trigger signal.

Specifically, the third device may broadcast the trigger signal or unicast the trigger signal, where the trigger signal may be used to trigger at least one second device to send a measurement signal.

702. After receiving the trigger signal, the second device sends a measurement signal.

703. A device that is in a first device set and that receives the measurement signal sends a feedback signal to the third device.

The feedback signal may carry an identifier of the device that sends the feedback signal, or may further carry a measurement result obtained by detecting the measurement signal. In addition, the feedback signal further carries an identifier of the second device. The measurement result of the measurement signal may be measured signal quality or signal strength of the signal, for example, power of the received signal.

Optionally, the trigger signal sent in step 701 may be used to trigger a device in the first device set to send a feedback signal after the device receives the measurement signal.

Optionally, in any step before step 703, the third device may further send a trigger signal, where the trigger signal may be used to trigger a device in the first device set to send a feedback signal to the third device after the device receives the measurement signal.

Optionally, all devices in the first device set receive the measurement signal, and all the devices that receive the measurement signal send feedback signals to the third device, where the feedback signals include signal quality of the received measurement signal and identifiers of the devices that send the feedback signals; and the third device selects a device corresponding to the received measurement signal with lowest signal quality as a device paired with the second device.

Optionally, some devices in the first device set receive the measurement signal, and the devices that receive the measurement signal all send feedback signals to the third device, where the feedback signals carry identifiers of the devices that send the feedback signals; and the third device selects a device that is in the first device set and that sends no feedback signal as a device paired with the second device.

Optionally, in the devices in the first device set, only a device that receives the measurement signal whose signal quality is greater than or equal to a preset value sends a feedback signal to the third device, where the feedback signal includes an identifier of the device that sends the third feedback signal; and the third device selects a device that is in the first device set and that sends no feedback signal as a device paired with the second device.

704. The third device determines, based on the feedback signal, that a device that is in the first device set and that is paired with the second device is a first device.

705. The third device sends a first signal to the first device by using a first transmit sector, where the first transmit sector is corresponding to the first device set, and the first device set includes the first device.

706. While sending the first signal to the first device by using the first transmit sector, the third device receives, by using a first receive sector, a second signal sent by the second device, where the first receive sector is corresponding to a second device set, and the second device set includes the second device.

Therefore, according to the full-duplex communication method in this embodiment of this application, the third device may send the trigger signal depending on a requirement, so as to trigger the second device to send the measurement signal and/or a device that receives the measurement signal to send a feedback signal, thereby avoiding an unnecessary waste and reducing signaling overheads.

Figure 8:
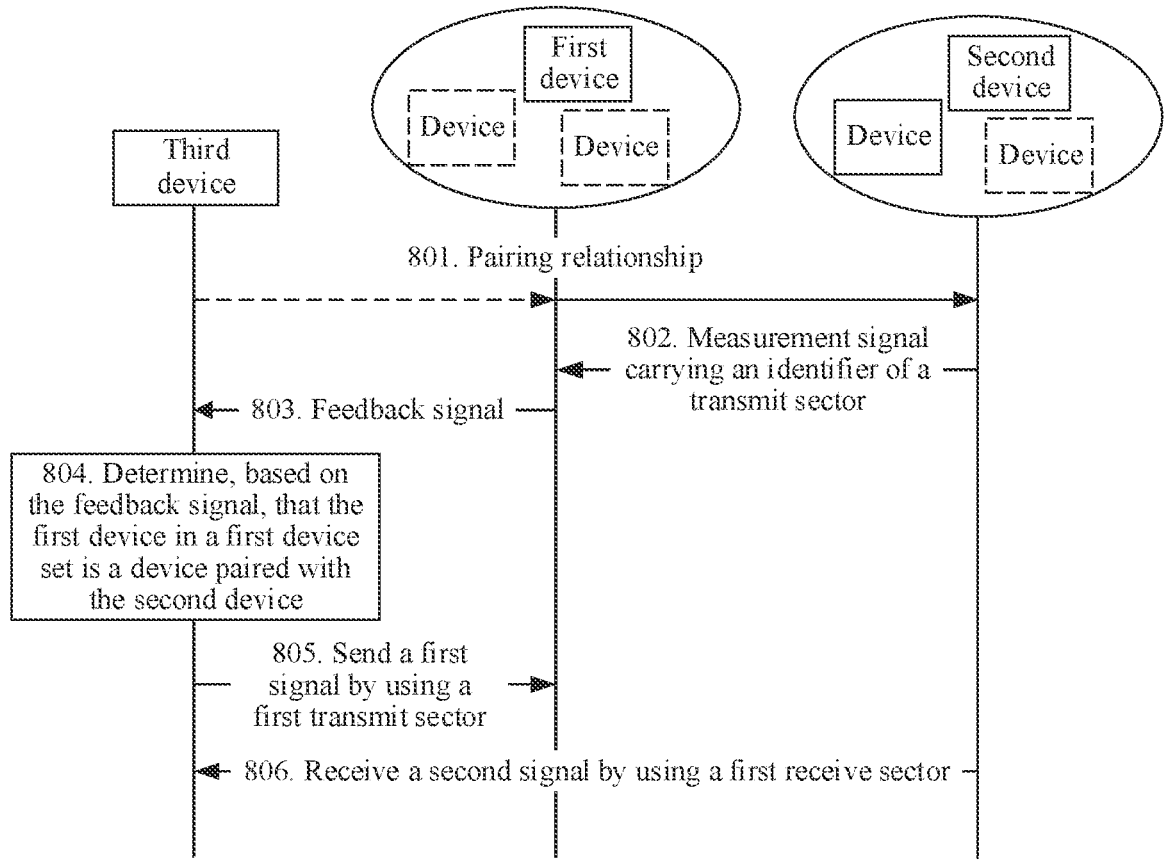
FIG. 8 is a schematic flowchart of another full-duplex communication method according to an embodiment of this application.

FIG. 8 is a schematic flowchart of another specific embodiment of this application.

It should be understood that meanings indicated by same terms in this embodiment of this application and the embodiments shown in FIG. 5, FIG. 6, and FIG. 7 are the same. To avoid repetition, details are not described herein again.

801. A third device configures a pairing relationship between a transmit sector and a receive sector.

The third device may broadcast the pairing relationship, and correspondingly, a device in a second device set may receive the pairing relationship.

802. A device in the second device set may send a measurement signal, where the measurement signal carries an identifier of a receive sector corresponding to the second device set.

It should be understood that in the beamforming training process shown in FIG. 4A and FIG. 4B, for example, the first device that has undergone the beamforming training process may determine the optimal transmit sector, corresponding to the device, of the third device by using step 401 and step 404 in FIG. 4A and FIG. 4B, and correspondingly may determine that the device belongs to a device set corresponding to the optimal transmit sector; and the device may determine the optimal receive sector, corresponding to the device, of the third device by using step 406 and step 409 in FIG. 4A and FIG. 4B, and correspondingly may determine that the device belongs to a device set corresponding to the optimal receive sector.

Optionally, the measurement signal may further carry an identifier of the device that sends the measurement signal.

It should be understood that a sequence of step 801 and step 802 is not limited in this embodiment of this application.

803. A device that is in a first device set and that receives the measurement signal sends a feedback signal.

The device that is in the first device set and that receives the measurement signal may determine a pairing relationship between a device set to which the device belongs and another device set based on the identifier, included in the measurement signal, of the receive sector corresponding to the second device set and with reference to information about the optimal transmit sector and the optimal receive sector that is learned in the beamforming training process, and a pairing relationship between a first transmit sector and a first receive sector. Further, the device that receives the measurement signal sends the feedback signal to the third device when the receive sector indicated by the identifier, carried in the measurement signal, of the receive sector is paired with a transmit sector to which the device belongs. For example, as shown in FIG. 3, a pairing relationship sent by the AP is a pairing relationship between a transmit sector 1 and a receive sector 1, and an identifier, carried in a measurement signal, of a receive sector is the receive sector 1. The STA 1 determines, according to step 401 and step 404, that a corresponding optimal transmit sector of the third device is the transmit sector 1. After step 406 and step 409 are performed, the STA 1 determines that a corresponding optimal receive sector of the third device is a receive sector 2. It can be learned from the pairing relationship that the STA 1 is included in a first device set corresponding to the transmit sector 1, and the first device set to which the STA 1 belongs is paired with a second device set corresponding to the receive sector 1. After receiving the measurement signal, the STA 1 sends a feedback signal to the AP if determining, based on the identifier that is of the receive sector 1 and that is carried in the measurement signal, that the transmit sector 1 to which the STA 1 belongs is paired with the receive sector 1 indicated by the sector identifier carried in the measurement signal.

Optionally, the third device may send a trigger signal to the first device set, to trigger a device in the first device set to send a feedback signal after the device receives the measurement signal.

804. The third device determines, based on the feedback signal, that a first device is a device paired with a second device.

Optionally, all devices in the first device set receive the measurement signal, and all the devices that receive the measurement signal send feedback signals to the third device, where the feedback signals include signal quality of the received measurement signal, and the feedback signals may further include identifiers of the devices that send the feedback signals; and the third device selects a device corresponding to the received measurement signal with lowest signal quality as a device paired with the second device.

Optionally, some devices in the first device set receive the measurement signal, and the devices that receive the measurement signal all send feedback signals to the third device, where the feedback signals may further include identifiers of the devices that send the feedback signals; and the third device selects a device that is in the first device set and that sends no feedback signal as a device paired with the second device.

Optionally, only a device that is in the first device set and that receives the measurement signal whose signal quality is greater than or equal to a preset value sends a feedback signal to the third device, where the feedback signal may further include an identifier of the device that sends the feedback signal; and the third device selects a device that is in the first device set and that sends no feedback signal as a device paired with the second device.

805. The third device sends a first signal to the first device by using a first transmit sector.

806. While sending the first signal to the first device by using the first transmit sector, the third device receives, by using a first receive sector, a second signal sent by the second device.

Therefore, according to the full-duplex communication method in this embodiment of this application, the third device preconfigures the pairing relationship between a transmit sector and a receive sector, so that the measurement signal sent by the second device may further carry the identifier of the receive sector, corresponding to the second device set, of the third device. In this way, a device that is in a communications system and that does not belong to the first device set corresponding to an identifier of the transmit sector may not send a feedback signal to the third device, thereby further reducing signaling overheads.

It should be understood that in the embodiments of this application, specific examples are merely intended to help a person skilled in the art better understand the embodiments of this application, rather than limit the scope of the embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail the full-duplex communication method according to the embodiments of this application. The following describes a full-duplex communications apparatus according to the embodiments of this application.

Figure 9:
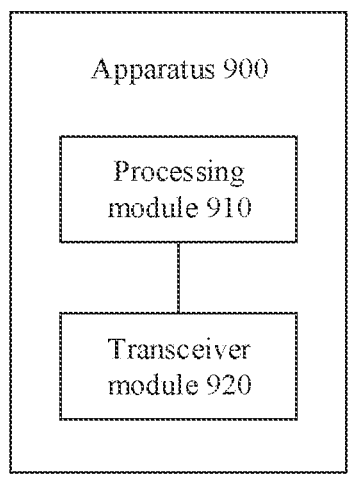
FIG. 9 is a schematic block diagram of a full-duplex communications apparatus according to an embodiment of this application.

FIG. 9 is a schematic block diagram of a full-duplex communications apparatus 900 according to an embodiment of this application. The apparatus 900 may include a processing module 910 and a transceiver module 920.

In an embodiment, the apparatus 900 shown in FIG. 9 may be corresponding to the third device in the foregoing method embodiments, and may have any function of the third device in the methods.

The processing module 910 is configured to generate a first signal.

The transceiver module 920 is configured to: when sending the first signal to a first device by using a first transmit sector in a transmit sector group, receive, by using a first receive sector in a receive sector group, a second signal sent by a second device, where the first receive sector is different from the first transmit sector.

Specifically, the processing module 910 may be corresponding to step 501 in FIG. 5, and the transceiver module 920 may be corresponding to step 502 and/or step 503 in FIG. 5.

Optionally, the first device belongs to a first device set corresponding to the first transmit sector, and the first transmit sector is an optimal transmit sector used when the third device sends a signal to a device in the first device set. The second device belongs to a second device set corresponding to the first receive sector, the first receive sector is an optimal receive sector used when the third device receives a signal sent by a device in the second device set, and isolation between the first transmit sector and the first receive sector is greater than or equal to a first preset value.

Optionally, before receiving, by using the first receive sector, the second signal sent by the second device, the transceiver module 920 is further configured to receive at least one third feedback signal, where the at least one third feedback signal is generated by a device that is in the first device set and that receives a third measurement signal, the third measurement signal is sent by the second device, and each of the at least one third feedback signal carries a device identifier of the second device. The processing module 910 is further configured to determine, based on the at least one third feedback signal, that the first device in the first device set is a device paired with the second device.

Optionally, each of the at least one third feedback signal further carries an identifier of a device that sends the third feedback signal, and the processing module 910 is specifically configured to determine a device in the first device set other than the device that sends the at least one third feedback signal, as the first device.

Optionally, each of the at least one third feedback signal carries a signal quality detection result of the third measurement signal received by the device that sends the third feedback signal and an identifier of the device that sends the third feedback signal, the processing module 910 is specifically configured to determine a device that is in the first device set and that sends a third feedback signal with lowest signal quality, as the first device.

Therefore, while sending the first signal to the first device by using the first transmit sector, the third device receives, by using the first receive sector, the second signal sent by the second device. A coverage area of the third device in a receiving direction may be divided into at least one receive sector, the at least one receive sector forms one receive sector group, and the third device may receive the second signal by using the first receive sector that is in the receive sector group and that is different from the first transmit sector. In this way, the third device can simultaneously receive a signal and send a signal by using different sectors, to implement full-duplex transmission, and reduce mutual interference between signal sending and signal receiving, thereby improving communication quality of the full-duplex transmission.

Optionally, the full-duplex communications apparatus 900 in this embodiment of this application may be the third device, or may be a chip in the third device.

It should be understood that the full-duplex communications apparatus 900 according to this embodiment of this application may be corresponding to the third device in the full-duplex communication methods in the embodiments in FIG. 5 to FIG. 8. In addition, the foregoing and other management operations and/or functions of the modules in the full-duplex communications apparatus 900 are respectively used to implement corresponding steps in the foregoing methods. For brevity, details are not described herein again.

Figure 10:
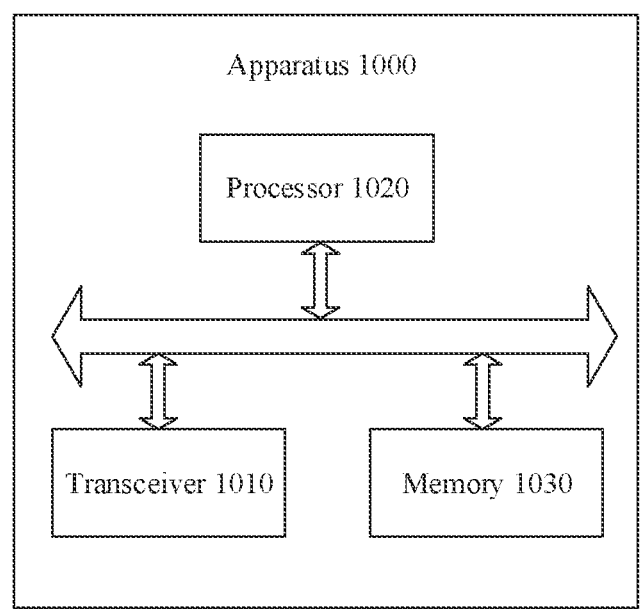
FIG. 10 is a schematic structural diagram of a full-duplex communications apparatus according to an embodiment of this application.

Optionally, if the full-duplex communications apparatus 900 is the third device, the transceiver module 920 in this embodiment of this application may include a receiving module and a sending module, or may be implemented by a transceiver 1010, and the processing module 910 may be implemented by a processor 1020. FIG. 10 is a schematic structural diagram of a full-duplex communications apparatus according to an embodiment of this application. The full-duplex communications apparatus 1000 may include the transceiver 1010 and the processor 1020. The processor 1020 may be configured to support the third device in performing a corresponding function in the foregoing methods. The transceiver 1010 may be configured to support communication between the third device and the first device and communication between the third device and the second device, and receive or send corresponding information or an instruction in the foregoing methods. In an example, the processor 1020 may perform baseband processing and radio frequency processing on a signal, and the transceiver 1010, for example, an antenna, may receive and send a signal. For example, the processor may perform baseband processing and radio frequency processing on a signal to generate the first signal, and then send the first signal through the antenna. For another example, the processor 1020 may generate a baseband signal. The transceiver 1010 may include a radio frequency circuit, configured to perform radio frequency processing on the baseband signal, and the radio frequency circuit may be configured to modulate a low-frequency baseband signal to a high-frequency carrier signal. The high-frequency carrier signal is transmitted through an antenna. The radio frequency circuit is also configured to demodulate a high-frequency signal received through the antenna, to obtain a low-frequency carrier signal. For example, the processor 1020 may generate the first signal, and then the transceiver 1010 processes (for example, performs analog-conversion, filtering, amplification, and up-conversion on) the first signal and sends the first signal. It may be understood that, the transceiver 1010 may further process (for example, perform filtering, amplification, down-conversion, and digitization on) a received signal.

Optionally, the full-duplex communications apparatus 1000 may further include a memory 1030. The memory 1030 may be configured to store indication information, and may be further configured to store code, an instruction, and the like that are executed by the processor 1020. The transceiver 1010 may include a radio frequency circuit. Optionally, the third device further includes a storage unit. The storage unit may be, for example, a memory. When the third device includes a storage unit, the storage unit is configured to store a computer executable instruction, the processing module is connected to the storage unit, and the processing module executes the computer executable instruction stored in the storage unit, so that the third device performs the foregoing full-duplex communication method.

Optionally, if the full-duplex communications apparatus 900 is the chip in the third device, the chip includes a processing module 910 and a transceiver module 920. The transceiver module 920 may be implemented by the transceiver 1010, and the processing module 910 may be implemented by the processor 1020. The transceiver module may be, for example, an input/output interface, a pin, or a circuit. The processing module may execute the computer-executable instruction stored in the storage unit. The storage unit is a storage unit in the chip, for example, a register or a cache. The storage unit may alternatively be a storage unit that is in a terminal and that is located outside the chip, for example, a read-only memory (ROM), another type of static storage device that can store static information and a static instruction, or a random access memory (RAM).

In another embodiment, the apparatus 900 shown in FIG. 9 may be corresponding to the first device in the foregoing method embodiments, and may have any function of the first device in the foregoing method embodiments.

The transceiver module 920 is configured to receive a measurement signal sent by a second device.

The processing module 910 is configured to generate a feedback signal based on the measurement signal, where the feedback signal is used by a third device to determine a first device that is in a first device set and that is paired with the second device.

The transceiver module 920 is further configured to send the feedback signal, where the feedback signal carries a device identifier of the second device.

Specifically, the processing module 910 may be corresponding to step 501 in FIG. 5, and the transceiver module 920 may be corresponding to step 502 and/or step 503 in FIG. 5.

Optionally, the first device set is corresponding to a first transmit sector, and the first transmit sector is an optimal transmit sector used when the third device sends a signal to a device in the first device set. The second device belongs to a second device set corresponding to a first receive sector, the first receive sector is an optimal receive sector used when the third device receives a signal sent by a device in the second device set, and isolation between the first transmit sector and the first receive sector is greater than or equal to a first preset value. The first transmit sector is a transmit sector in a transmit sector group of the third device, and the first receive sector is a receive sector in a receive sector group of the third device.

Optionally, the feedback signal further includes a signal quality detection result of the measurement signal received by the first device.

Optionally, the feedback signal further includes an identifier of the first device.

Therefore, the device that is in the first device set and that receives the measurement signal generates the feedback signal based on the measurement signal, and sends the feedback signal to the third device; and the third device selects, from the first device set based on the received feedback signal, the first device as a required paired device. In addition, the feedback signal carries the device identifier of the second device. In this way, the third device can determine, based on the device identifier, that the first device is a device paired with the second device corresponding to the device identifier, thereby improving communication quality of full-duplex transmission of the third device.

Optionally, the full-duplex communications apparatus 900 in this embodiment of this application may be the first device, or may be a chip in the first device.

It should be understood that the full-duplex communications apparatus 900 according to this embodiment of this application may be corresponding to the first device in the full-duplex communication methods in the embodiments in FIG. 5 to FIG. 8. In addition, the foregoing and other management operations and/or functions of the modules in the full-duplex communications apparatus 900 are respectively used to implement corresponding steps in the foregoing methods. For brevity, details are not described herein again.

Optionally, if the full-duplex communications apparatus 900 is the first device, the transceiver module 920 in this embodiment of this application may include a receiving module and a sending module, or may be implemented by a transceiver 1010, and the processing module 910 may be implemented by a processor 1020. FIG. 10 is a schematic structural diagram of a full-duplex communications apparatus according to an embodiment of this application. The full-duplex communications apparatus 1000 may include the transceiver 1010 and the processor 1020. The processor 1020 may be configured to support the first device in performing a corresponding function in the foregoing methods. The transceiver 1010 may be configured to support communication between the first device and the second device and communication between the first device and the third device, and receive or send corresponding information or an instruction in the foregoing methods. In an example, the processor 1020 may perform baseband processing and radio frequency processing on a signal, and the transceiver 1010, for example, an antenna, may receive and send a signal. For example, the transceiver 1010 may process (for example, perform filtering, amplification, down-conversion, and digitization on) a received measurement signal. The processor 1020 may generate, based on the measurement signal, feedback information that needs to be fed back, and perform baseband processing and radio frequency processing on the feedback information, to generate a feedback signal, and then sends the feedback signal to the third device through the antenna. In another example, the processor 1020 may generate a baseband signal. The transceiver 1010 may include a radio frequency circuit that may be configured to perform radio frequency processing on the baseband signal, to modulate a low-frequency baseband signal to a high-frequency carrier signal. The high-frequency carrier signal is transmitted through an antenna. The radio frequency circuit is also configured to demodulate a high-frequency signal received through the antenna, to obtain a low-frequency carrier signal. For example, the processor 1020 may generate a feedback signal based on a measurement signal, and then the transceiver 1010 processes (for example, performs analog conversion, filtering, amplification, and up-conversion on) the feedback signal, and sends the feedback signal to the third device.

Optionally, the full-duplex communications apparatus 1000 may further include a memory 1030. The memory 1030 may be configured to store indication information, and may be further configured to store code, an instruction, and the like that are executed by the processor 1020. The transceiver 1010 may include a radio frequency circuit. Optionally, the first device further includes a storage unit.

The storage unit may be, for example, a memory. When the first device includes a storage unit, the storage unit is configured to store a computer executable instruction, the processing module is connected to the storage unit, and the processing module executes the computer executable instruction stored in the storage unit, so that the first device performs the foregoing full-duplex communication method.

Optionally, if the full-duplex communications apparatus 900 is the chip in the first device, the chip includes a processing module 910 and a transceiver module 920. The transceiver module 920 may be implemented by the transceiver 1010, and the processing module 910 may be implemented by the processor 1020. The transceiver module may be, for example, an input/output interface, a pin, or a circuit. The processing module may execute the computer-executable instruction stored in the storage unit. The storage unit is a storage unit in the chip, for example, a register or a cache. The storage unit may alternatively be a storage unit that is in a terminal and that is located outside the chip, for example, a read-only memory (ROM), another type of static storage device that can store static information and a static instruction, or a random access memory (RAM).

In still another embodiment, the full-duplex communications apparatus 900 may be the second device.

It should be understood that the full-duplex communications apparatus 900 may be corresponding to the second device in the method embodiments, and may have any function of the second device in the methods in the foregoing embodiments.

The processing module 910 is configured to generate a measurement signal, where the measurement signal is used by a device in a first device set to generate a feedback signal, the feedback signal is used to determine a first device that is in the first device set and that is paired with the second device, and the feedback signal carries a device identifier of the second device.

The transceiver module 920 is configured to send the measurement signal.

Specifically, the processing module 910 may be corresponding to step 501 in FIG. 5, and the transceiver module 920 may be corresponding to step 502 and/or step 503 in FIG. 5.

Optionally, the first device set is corresponding to a first transmit sector, and the first transmit sector is an optimal transmit sector used when the third device sends a signal to a device in the first device set. The second device belongs to a second device set corresponding to a first receive sector, the first receive sector is an optimal receive sector used when the third device receives a signal sent by a device in the second device set, and isolation between the first transmit sector and the first receive sector is greater than or equal to a first preset value. The first transmit sector is a transmit sector in a transmit sector group of the third device, and the first receive sector is a receive sector in a receive sector group of the third device.

Therefore, the second device in the second device set generates the measurement signal, and sends the measurement signal to the first device set. The device that is in the first device set and that receives the measurement signal generates the feedback signal based on the measurement signal, and sends the feedback signal to the third device; and the third device selects, from the first device set based on the received feedback signal, the first device as a required paired device. In addition, the feedback signal carries the device identifier of the second device. In this way, the third device can determine, based on the device identifier, that the first device is a device paired with the second device corresponding to the device identifier, thereby improving communication quality of full-duplex transmission of the third device.

Optionally, the full-duplex communications apparatus 900 in this embodiment of this application may be the second device, or may be a chip in the second device.

It should be understood that the full-duplex communications apparatus 900 according to this embodiment of this application may be corresponding to the second device in the full-duplex communication methods in the embodiments in FIG. 5 to FIG. 8. In addition, the foregoing and other management operations and/or functions of the modules in the full-duplex communications apparatus 900 are respectively used to implement corresponding steps in the foregoing methods. For brevity, details are not described herein again.

Optionally, if the full-duplex communications apparatus 900 is the second device, the transceiver module 920 in this embodiment of this application may include a receiving module and a sending module, or may be implemented by a transceiver 1010, and the processing module 910 may be implemented by a processor 1020. FIG. 10 is a schematic structural diagram of a full-duplex communications apparatus according to an embodiment of this application. The full-duplex communications apparatus 1000 may include the transceiver 1010 and the processor 1020. The processor 1020 may be configured to support the second device in performing a corresponding function in the foregoing methods. The transceiver 1010 may be configured to support communication between the second device and the first device and communication between the second device and the third device, and receive or send corresponding information or an instruction in the foregoing methods. In an example, the processor 1020 may perform baseband processing and radio frequency processing on a signal, and the transceiver 1010, for example, an antenna, may receive and send a signal. For example, the processor may perform baseband processing and radio frequency processing on a signal to generate a measurement signal, and then send the first signal through the antenna. For another example, the processor 1020 may generate a baseband signal. The transceiver 1010 may include a radio frequency circuit, configured to perform radio frequency processing on the baseband signal, and the radio frequency circuit may be configured to modulate a low-frequency baseband signal to a high-frequency carrier signal. The high-frequency carrier signal is transmitted through an antenna. The radio frequency circuit is also configured to demodulate a high-frequency signal received through the antenna, to obtain a low-frequency carrier signal. For example, the processor 1020 may generate a measurement signal, and then the transceiver 1010 processes (for example, performs analog-conversion, filtering, amplification, and up-conversion on) the measurement signal and then sends the measurement signal to the first device. It may be understood that, the transceiver 1010 may further process (for example, perform filtering, amplification, down-conversion, and digitization on) a received signal. For example, the transceiver 1010 performs processing such as filtering, amplification, down-conversion, and digitization on the received first signal sent by the third device.

Optionally, the full-duplex communications apparatus 1000 may further include a memory 1030. The memory 1030 may be configured to store indication information, and may be further configured to store code, an instruction, and the like that are executed by the processor 1020. The transceiver may include a radio frequency circuit. Optionally, the second device further includes a storage unit.

The storage unit may be, for example, a memory. When the second device includes a storage unit, the storage unit is configured to store a computer executable instruction, the processing module is connected to the storage unit, and the processing module executes the computer executable instruction stored in the storage unit, so that the second device performs the foregoing full-duplex communication method.

Optionally, if the full-duplex communications apparatus 900 is the chip in the second device, the chip includes a processing module 910 and a transceiver module 920. The transceiver module 920 may be, for example, an input/output interface, a pin, or a circuit on the chip. The processing module 910 may execute the computer executable instruction stored in the storage unit.

Optionally, the storage unit is a storage unit in the chip, for example, a register or a cache. The storage unit may alternatively be a storage unit that is in a terminal and that is located outside the chip, for example, a read-only memory (ROM), another type of static storage device that can store static information and a static instruction, or a random access memory (RAM). The storage unit is a storage unit in the chip, for example, a register or a cache. The storage unit may alternatively be a storage unit that is in a terminal and that is located outside the chip, for example, a read-only memory (ROM), another type of static storage device that can store static information and a static instruction, or a random access memory (RAM).

It should be understood that the processor 1020 in this embodiment of this application may be an integrated circuit chip and has a signal processing capability. In an implementation process, steps in the foregoing method embodiments can be implemented by using a hardware integrated logical circuit in the processor, or by using instructions in the form of software. The foregoing processor may be a general purpose processor, a digital signal processor, (DSP), an application-specific integrated circuit (ASIC), a field programmable gate array (FPGA) or another programmable logical device, a discrete gate or transistor logic device, or a discrete hardware component. The processor 1020 may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory 1030 in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synch Link DRAM, SLDRAM), and a direct rambus dynamic random access memory (Direct Rambus RAM, DR RAM). It should be noted that the memory of the systems and methods described in this specification includes but is not limited to these and any memory of another proper type.

An embodiment of this application further provides a computer storage medium, and the computer storage medium may store a program instruction used to indicate any one of the foregoing methods.

Optionally, the storage medium may be specifically the memory 1030.

This embodiment of this application further provides a chip system. The chip system includes a processor, configured to support a distributed unit, a centralized unit, the first device, the second device, and the third device in implementing a function in the foregoing embodiments, for example, generating or processing data and/or information in the foregoing methods.

In a possible design, the chip system further includes a memory. The memory is configured to store program instructions and data that are necessary for the distributed unit, the centralized unit, the first device, the second device, and the third device. The chip system may include a chip, or may include a chip and another discrete component.

It should be understood that the term "and/or" in this specification describes only an association relationship for describing associated objects and represents that three relationships may exist. For example. A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer readable storage medium. Based on such an understanding, the technical solutions of this application essentially, or the part contributing to the prior art, or some of the technical solutions may be implemented in the form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory, (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving, by a first device in a first device set, a measurement signal sent by a second device; and
   sending, by the first device to a third device that is different from the first device and that is different from the second device, a feedback signal based on the measurement signal sent by the second device, wherein the feedback signal carries information that indicates, to the third device, a device that is in the first device set and that is paired with the second device, and the feedback signal carries a device identifier of the second device.

2. The method according to claim 1, wherein the first device set is corresponding to a first transmit sector, the first transmit sector is an optimal transmit sector used when the third device sends a signal to a device in the first device set, the second device belongs to a second device set corresponding to a first receive sector, the first receive sector is an optimal receive sector used when the third device receives a signal sent by a device in the second device set, isolation between the first transmit sector and the first receive sector is greater than or equal to a first preset value, the first transmit sector is a transmit sector in a transmit sector group of the third device, and the first receive sector is a receive sector in a receive sector group of the third device.

3. The method according to claim 2, wherein the method further comprises:

receiving, by the first device, a pairing relationship, wherein the pairing relationship comprises a pairing relationship between the first transmit sector and the first receive sector.

4. The method according to claim 3, wherein the measurement signal further comprises an identifier of the first receive sector corresponding to the second device set to which the second device belongs, and the sending, by the first device, a feedback signal based on the measurement signal comprises:
   determining, by the first device based on the pairing relationship and the identifier of the first receive sector, a transmit sector corresponding to the receive sector indicated by the identifier of the first receive sector; and
   sending, by the first device, the feedback signal when the first device belongs to a device set corresponding to the transmit sector.

5. The method according to claim 1, wherein before the sending, by the first device, a feedback signal, the method further comprises:
   receiving, by the first device, a trigger signal, wherein the trigger signal is used to trigger the first device to send the feedback signal after the first device receives the measurement signal.

6. The method according to claim 1, wherein the sending, by the first device, a feedback signal based on the measurement signal comprises:
   sending, by the first device, the feedback signal when signal quality of the measurement signal is greater than or equal to a preset quality threshold.

7. The method according to claim 6, wherein the feedback signal further carries a signal quality detection result of the measurement signal received by the first device and an identifier of the first device.

8. The method according to claim 1, wherein when the first device is a device paired with the second device, the method further comprises:
   sending, by the first device, a first signal to the third device.

9. A first device in a first device set, comprising:
   a transceiver;
   a non-transitory memory storage comprising instructions;
   one or more hardware processors in communication with the non-transitory memory storage, wherein the instructions, when executed by the one or more hardware processors, cause the first device to: receive, by using the transceiver, a measurement signal sent by a second device; and
   send, by using the transceiver to a third device that is different from the first device and that is different from the second device, a feedback signal based on the measurement signal sent by the second device, wherein the feedback signal carries information that indicates, to the third device, a device that is in the first device set and that is paired with the second device, and the feedback signal carries a device identifier of the second device.

10. The device according to claim 9, wherein the first device set is corresponding to a first transmit sector, the first transmit sector is an optimal transmit sector used when the third device sends a signal to a device in the first device set, the second device belongs to a second device set corresponding to a first receive sector, the first receive sector is an optimal receive sector used when the third device receives a signal sent by a device in the second device set, isolation between the first transmit sector and the first receive sector is greater than or equal to a first preset value, the first transmit sector is a transmit sector in a transmit sector group of the third device, and the first receive sector is a receive sector in a receive sector group of the third device.

11. The first device according to claim 10, wherein the instructions, when executed by the one or more hardware processors, cause the first device to: receive, by using the transceiver, a pairing relationship, wherein the pairing relationship comprises a pairing relationship between the first transmit sector and the first receive sector.

12. The first device according to claim 11, wherein the measurement signal further comprises an identifier of the first receive sector corresponding to the second device set to which the second device belongs, and the instructions, when executed by the one or more hardware processors, cause the first device to:
send, by using the transceiver, a feedback signal based on the measurement signal;
determine based on the pairing relationship and the identifier of the first receive sector, a transmit sector corresponding to the receive sector indicated by the identifier of the first receive sector; and
send, by using the transceiver, the feedback signal when the first device belongs to a device set corresponding to the transmit sector.

13. The first device according to claim 9, wherein the instructions, when executed by the one or more hardware processors, cause the first device to: receive, by using the transceiver, a trigger signal before the transceiver send a feedback signal, wherein the trigger signal is used to trigger the first device to send the feedback signal after the first device receives the measurement signal.

14. The first device according to claim 9, wherein the instructions, when executed by the one or more hardware processors, cause the first device to: send, by using the transceiver, the feedback signal when signal quality of the measurement signal is greater than or equal to a preset quality threshold.

15. The first device according to claim 14, wherein the feedback signal further carries a signal quality detection result of the measurement signal received by the first device and an identifier of the first device.

16. The first device according to claim 9, wherein when the first device is a device paired with the second device, the instructions, when executed by the one or more hardware processors, cause the first device to: send, by using the transceiver, a first signal to the third device.

17. A non-transitory computer readable storage medium, comprising an instruction, wherein when the instruction is run on a computer, the computer is enabled to perform operations comprising:
receiving, by a first device in a first device set, a measurement signal sent by a second device; and
sending, by the first device to a third device that is different from the first device and that is different from the second device, a feedback signal based on the measurement signal sent by the second device, wherein the feedback signal carries information that indicates, to the third device, a device that is in the first device set and that is paired with the second device, and the feedback signal carries a device identifier of the second device.

18. The computer readable storage medium according to claim 17, wherein the first device set is corresponding to a first transmit sector, the first transmit sector is an optimal transmit sector used when the third device sends a signal to a device in the first device set, the second device belongs to a second device set corresponding to a first receive sector, the first receive sector is an optimal receive sector used when the third device receives a signal sent by a device in the second device set, isolation between the first transmit sector and the first receive sector is greater than or equal to a first preset value, the first transmit sector is a transmit sector in a transmit sector group of the third device, and the first receive sector is a receive sector in a receive sector group of the third device.

19. The computer readable storage medium according to claim 18, wherein the operations further comprise:
receiving, by the first device, a pairing relationship, wherein the pairing relationship comprises a pairing relationship between the first transmit sector and the first receive sector.

20. The computer readable storage medium according to claim 19, wherein the measurement signal further comprises an identifier of the first receive sector corresponding to the second device set to which the second device belongs, and the sending, by the first device, a feedback signal based on the measurement signal comprises:
determining, by the first device based on the pairing relationship and the identifier of the first receive sector, a transmit sector corresponding to the receive sector indicated by the identifier of the first receive sector; and
sending, by the first device, the feedback signal when the first device belongs to a device set corresponding to the transmit sector.

* * * * *